(12) United States Patent
Nykilchuk et al.

(10) Patent No.: US 11,614,109 B2
(45) Date of Patent: Mar. 28, 2023

(54) AUTOMATIC DISENGAGING LINKAGE SYSTEM AND METHOD

(71) Applicant: Innovative Door Systems, Inc., West Kelowna (CA)

(72) Inventors: Trever Nykilchuk, West Kelowna (CA); Dave R. Weinstein, Winfield (CA)

( * ) Notice: Subject to any disclaimer, the term of this patent is extended or adjusted under 35 U.S.C. 154(b) by 231 days.

(21) Appl. No.: 16/801,784

(22) Filed: Feb. 26, 2020

(65) Prior Publication Data

US 2021/0262498 A1      Aug. 26, 2021

(51) Int. Cl.
*F16B 2/10* (2006.01)
*E05F 15/40* (2015.01)

(52) U.S. Cl.
CPC ............. *F16B 2/10* (2013.01); *E05F 15/40* (2015.01); *E05Y 2201/686* (2013.01); *E05Y 2800/40* (2013.01); *E05Y 2900/106* (2013.01)

(58) Field of Classification Search
CPC ...... Y10T 403/592; F16B 2/10; F16B 21/165; E05Y 2900/106; E05Y 2800/252; E05Y 2201/686; E05Y 2800/40; E05F 15/668; E05F 15/40
See application file for complete search history.

(56) References Cited

U.S. PATENT DOCUMENTS

| | | | |
|---|---|---|---|
| 2,639,143 A | 5/1953 | Vaughn | |
| 3,181,049 A | 4/1965 | Klamp | |
| 3,264,785 A | 8/1966 | Miller | |
| 3,443,339 A | 5/1969 | Richard | |
| 4,597,224 A | 7/1986 | Tucker | |
| 4,813,305 A * | 3/1989 | Dilich | E05F 15/41 160/188 |
| 4,905,542 A * | 3/1990 | Burm | E05F 15/668 74/625 |
| D337,042 S | 7/1993 | Lin et al. | |
| 6,554,524 B1 * | 4/2003 | Smith | H02G 7/04 403/322.2 |
| 7,234,208 B2 | 6/2007 | Harley | |
| 8,100,163 B2 | 1/2012 | Nicholson | |
| 8,128,142 B2 | 3/2012 | Glotzl | |
| 8,196,268 B1 | 6/2012 | Placeres | |

(Continued)

FOREIGN PATENT DOCUMENTS

| | | |
|---|---|---|
| CA | 2265006 A1 | 9/2000 |
| GB | 606921 A | 8/1948 |
| GB | 1310842 A | 3/1973 |

*Primary Examiner* — Robert Sandy
(74) *Attorney, Agent, or Firm* — David Guerra

(57) ABSTRACT

An automatic disengaging linkage system including a housing operably connectable to a garage door trolley and a garage door arm. The housing can define a main bore configured to receive a portion of the garage door arm. A ball can be receivable in a ball bore defined in the housing. A biasing member can be configured to force the ball in engagement with the garage door arm or an arm pin associated with the garage door arm. The ball or the biasing member can be configured to disengage with the garage door arm with the housing when a predetermined pulling force is applied to the housing. The garage door arm can automatically be disengaged with the housing upon encounter a sufficient pulling force that retracts the ball into its ball bore thereby allowing the garage door arm to move freely out from the main bore.

16 Claims, 12 Drawing Sheets

(56) References Cited

U.S. PATENT DOCUMENTS

| | | |
|---|---|---|
| D667,036 S | 9/2012 | Myers et al. |
| 8,964,289 B2 | 2/2015 | Euteneuer |
| 9,051,955 B2 | 6/2015 | Turnipseed |
| 9,080,361 B2 | 7/2015 | Nykilchuk |
| 2003/0000655 A1 | 1/2003 | Martin |
| 2008/0272609 A1 | 11/2008 | Knieling et al. |
| 2011/0108217 A1 | 5/2011 | Levin |
| 2015/0337580 A1 | 11/2015 | Nykilchuk |
| 2015/0354257 A1 | 12/2015 | Nykilchuk |
| 2015/0376926 A1 | 12/2015 | Nykilchuk |
| 2017/0096852 A1 | 4/2017 | Mello, II |
| 2017/0194083 A1 | 7/2017 | Bohannon |
| 2018/0125173 A1 | 5/2018 | Lambert |

\* cited by examiner

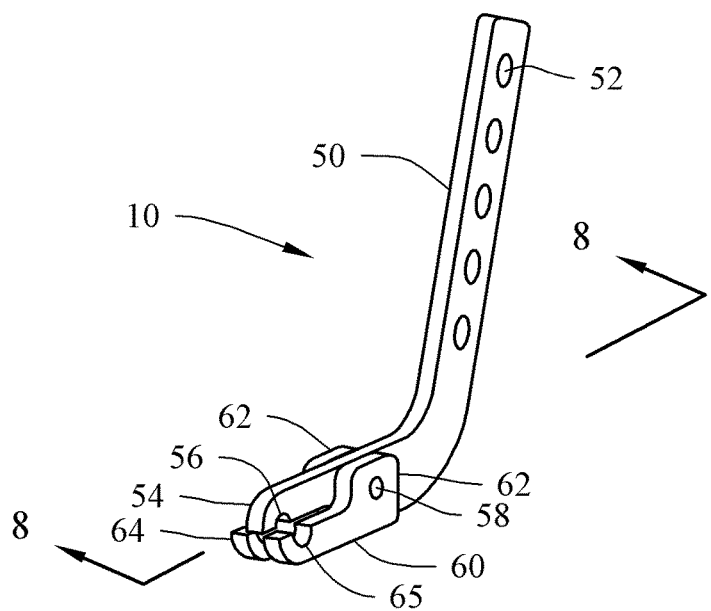
FIG. 7
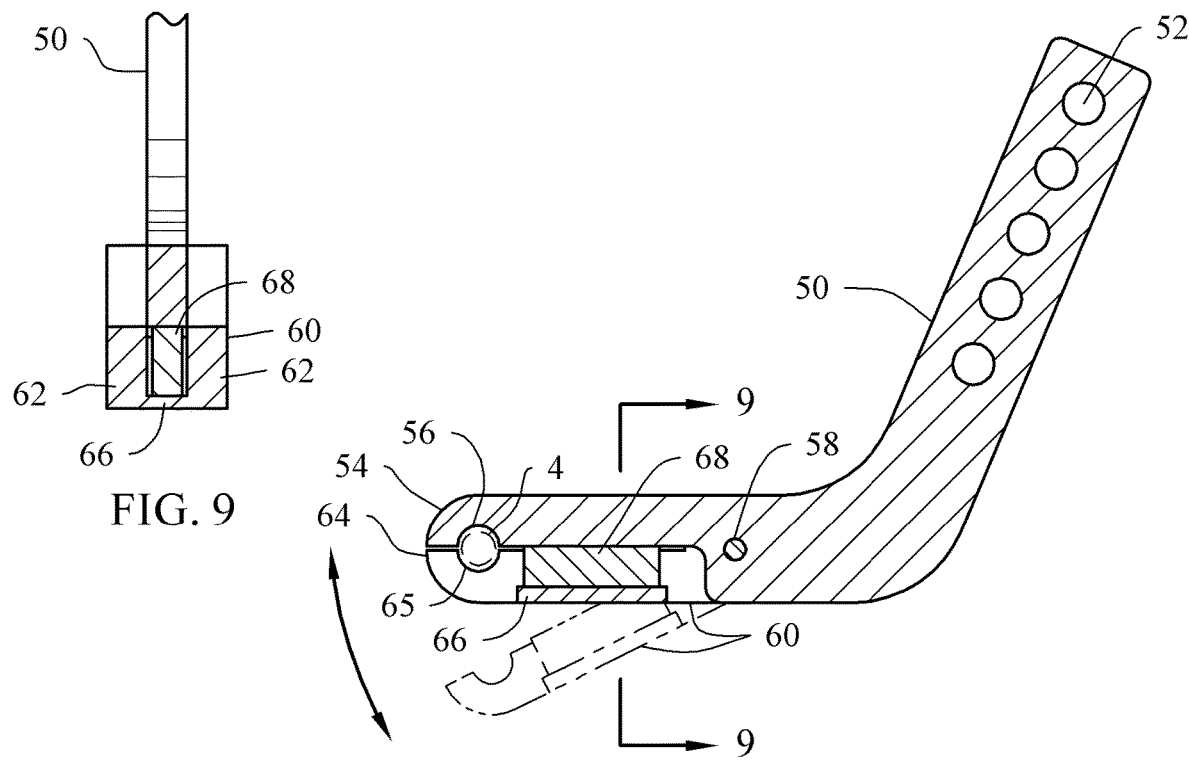
FIG. 9
FIG. 8

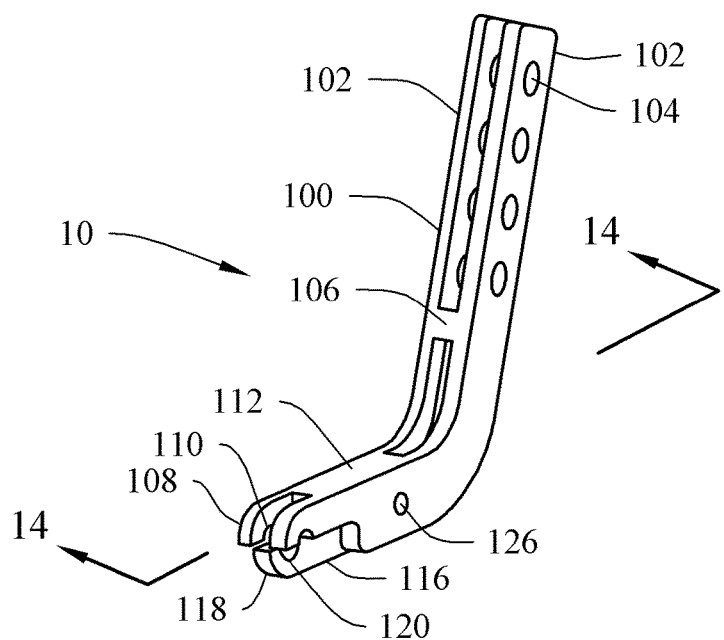
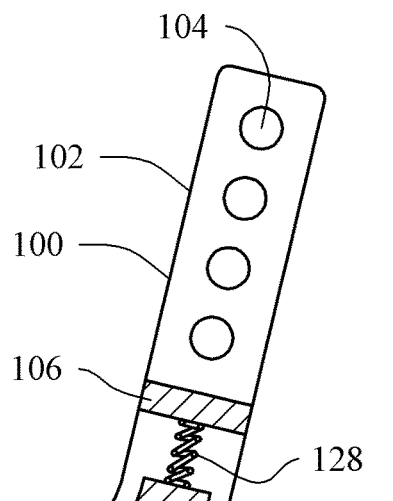
FIG. 13
FIG. 14
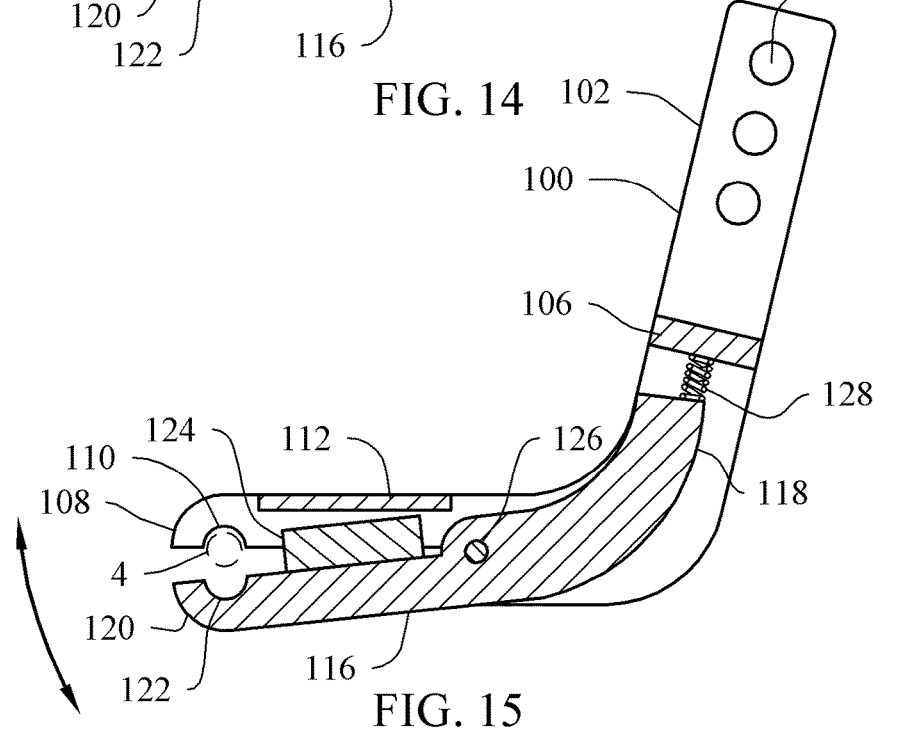
FIG. 15

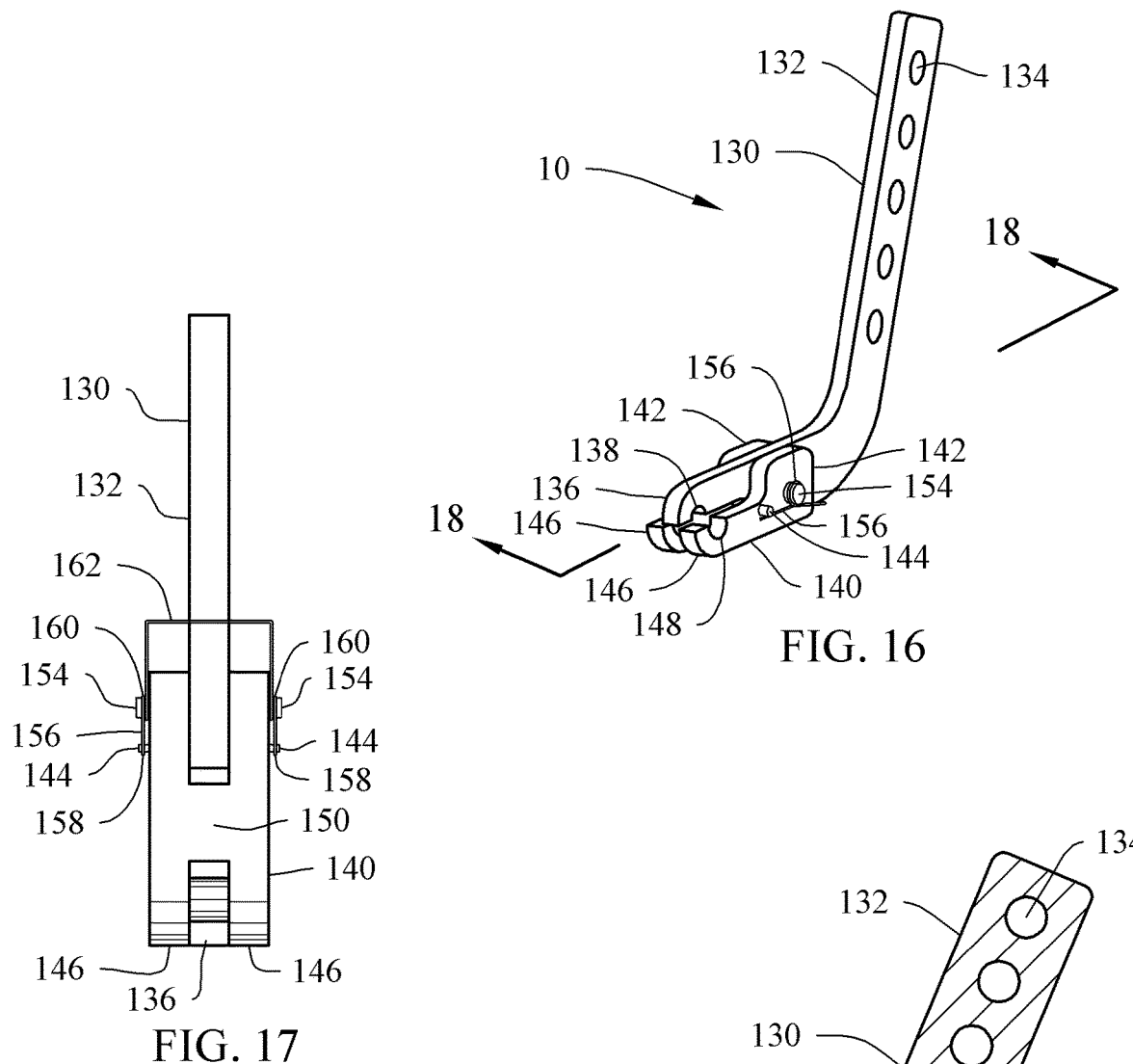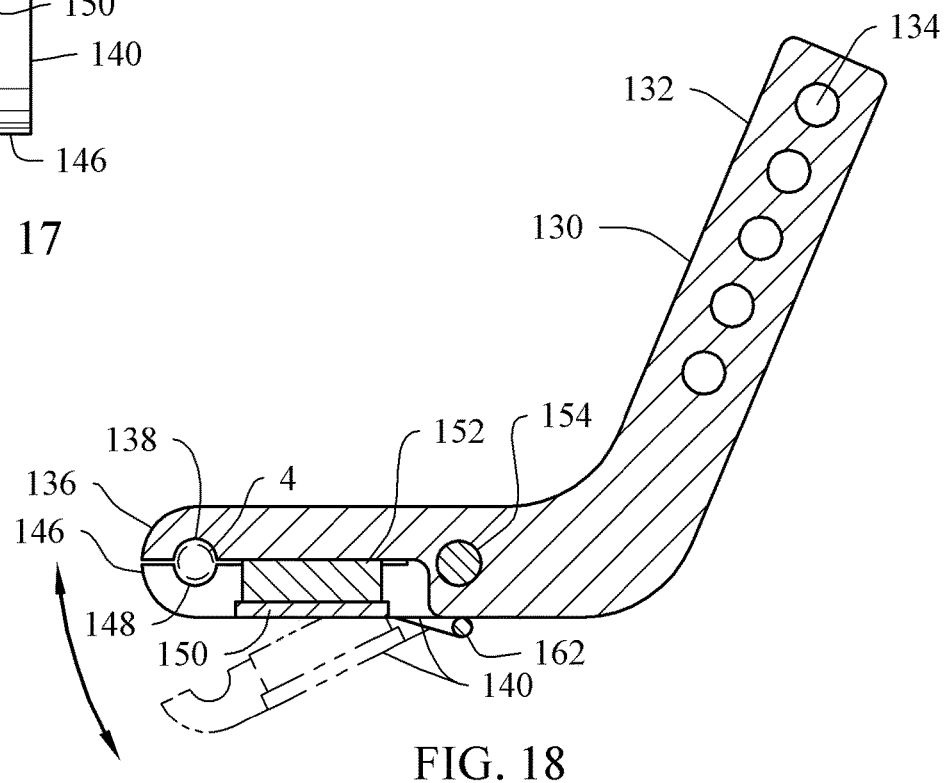

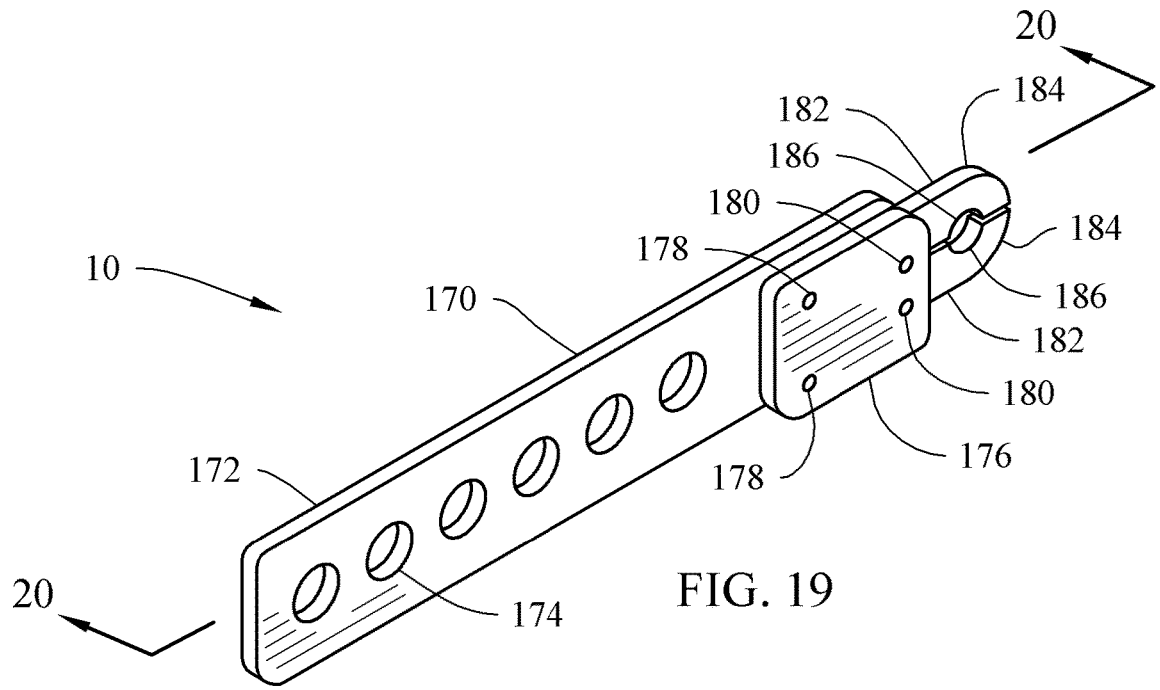
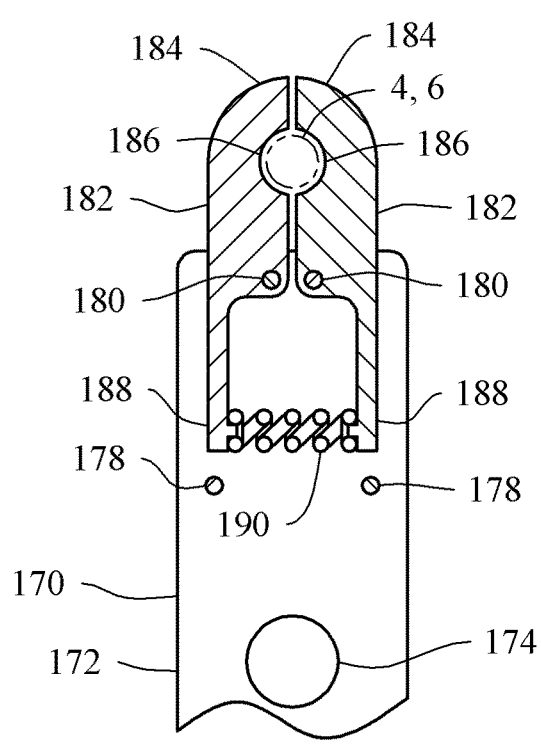
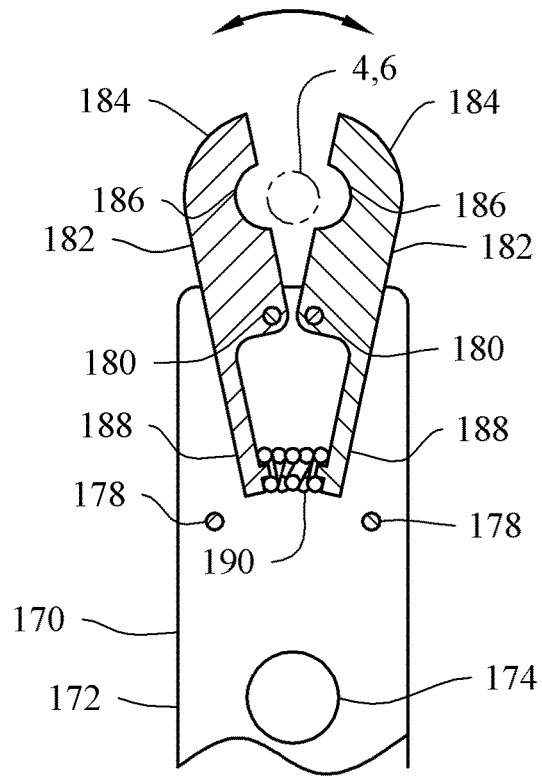
FIG. 19
FIG. 20
FIG. 21

AUTOMATIC DISENGAGING LINKAGE SYSTEM AND METHOD

BACKGROUND

Technical Field

The present technology relates to an automatic disengaging linkage system and method for use in connection with preventing a garage door and/or opener from being damage due to spring failure or roller obstruction by releasing a J-arm from the door bracket or door bracket or trolley coupler.

Background Description

The majority of overhead doors include multiple door panel sections that are hinged together and which travel along parallel sidetracks or rails from a closed vertical position to an open horizontal position. These overhead doors typically utilize a torsion spring connected to a shaft, which supplies the force to counter balance the weight of the door during the opening operation. The spring has a life cycle and will break or fail when reached. Utilizing a motorized garage door opener to raise the garage door with a broken spring or an obstruction of a garage door roller can lead to damage to the garage door and/or opener.

The use of a garage door linkage or J-arm to couple the garage door to the garage door opener is known. These known J-arms can include two members that are mechanically joined, thereby allowing the J-arm to adjust to different lengths for accommodating different mounting arrangements between the garage door bracket and the trolley coupler. Some trolley couplers include a release latch that disconnects the trolley to a moving carriage or power screw of the garage door opener. However, this is only useful if a person knows that the spring is broken or that an obstruction exists with a roller of the garage door.

A common problem is where a person is not aware that the spring is broken or that a roller is obstructed, and the person then attempts to operate the garage door opener multiple times. Thus, operation of the motorized garage door opener to raise the garage door with a broken spring or an obstruction of a garage door roller can lead to damage to the garage door and/or opener.

At least one disadvantage to these known J-arms is that the two members are fixedly joined, thereby always translating a movement force of the trolley coupler to the garage door. Consequently, the two members of these known J-arms can only be disconnected if a person manually separates them usually be unscrewing a fastener(s) that connects the two members together.

While the above-described devices fulfill their respective, particular objectives and requirements, the aforementioned patents do not describe an automatic disengaging linkage system and method that allows preventing a garage door and/or opener from being damage due to spring failure or roller obstruction by releasing a J-arm from the door bracket or door bracket or trolley coupler.

Therefore, a need exists for a new and novel automatic disengaging linkage system and method that can be used for preventing a garage door and/or opener from being damage due to spring failure or roller obstruction by releasing a J-arm from the door bracket or door bracket or trolley coupler. In this regard, the present technology substantially fulfills this need. In this respect, the automatic disengaging linkage system and method according to the present technology substantially departs from the conventional concepts and designs of the known garage door linkages, and in doing so provides an apparatus primarily developed for the purpose of preventing a garage door and/or opener from being damage due to spring failure or roller obstruction by releasing a J-arm from the door bracket or door bracket or trolley coupler.

BRIEF SUMMARY OF THE PRESENT TECHNOLOGY

In view of the foregoing disadvantages inherent in the known types of garage door linkages, straight arms or J-arms now present, the present technology provides a novel automatic disengaging linkage system and method, and overcomes the above-mentioned disadvantages and drawbacks of the known garage door linkages. As such, the general purpose of the present technology, which will be described subsequently in greater detail, is to provide a new and novel automatic disengaging linkage system and method and method which has all the advantages of the known garage door linkages mentioned heretofore and many novel features that result in an automatic disengaging linkage system and method which is not anticipated, rendered obvious, suggested, or even implied by the known garage door linkages, either alone or in any combination thereof.

According to one aspect, the present technology can include an automatic disengaging linkage system including a housing operably connectable to a moving member and a moveable member. A ball can be receivable in a ball bore defined in the housing. A biasing member can be configured to bias the ball toward the moveable member or an arm pin associated with the moveable member. The ball or the biasing member can be configured to hold the moveable member with the housing until a predetermined pulling force is applied to the housing.

According to another aspect, the present technology can include an automatic disengaging linkage system including a housing operably connectable to a garage door trolley and a garage door arm. The housing can define a main bore configured to receive a portion of the garage door arm. A ball can be receivable in a ball bore defined in the housing. A biasing member can be configured to force the ball in engagement with the garage door arm or an arm pin associated with the garage door arm. The ball or the biasing member can be configured to disengage with the garage door arm with the housing when a predetermined pulling force is applied to the housing.

According to sill another aspect, the present method can include a method of using an automatic disengaging linkage system. The method can include the steps of connecting a housing to a garage door trolley and to a garage door arm. Biasing a ball toward the garage door arm or an arm pin associated with the garage door arm using a biasing member. Disengaging the garage door arm from the housing when a predetermined pulling force is applied to the housing.

According to yet another aspect, the present technology can include an automatic disengaging linkage system including a first arm, a second arm, and a motive member. The first arm can include a first arm engaging portion configured to engage with a component associated with a door or a door opener. The second arm can be pivotable associated with the first arm. The second arm can include a second arm portion configured to engage with the component associated with the door or the door opener. The motive member can be configured or configurable to provide a motive force capable of pivoting or keeping the first arm engaging portion and the second arm engaging portion in a closed positioned so that the first arm engaging portion and the second arm engaging portion are engaged with the component.

According to still yet another aspect, the present technology can include an automatic disengaging linkage system comprising a trolley carriage including a carriage, a coupler, and an engaging arm. The coupler can be configured to slide along a rail associated with a garage door opener system. The coupler can be connected to a drive assembly that is driven by a motor unit of the garage door opener system. The coupler can be configured or configurable to receive a portion of the carriage, and can be attachable to a linkage arm system associated with a garage door. The engaging arm can be pivotably connected to the coupler, and can include a first end section including a curved extension, and a second end section. The curved extension can be receivable through an opening defined in the portion of the carriage to couple the carriage and the coupler. A spring can be connected to the coupler and the second end section of the engaging arm to provide a pivoting action of the curved extension away from the opening. The curve extension can be configured or configurable to keep the carriage engaged with the coupler until a predetermined force is encounter between an edge defining the opening and the curved extension.

According to yet another aspect, the present technology can include a method of using an automatic disengaging linkage system. The method can include the steps of connecting a first end of a first arm to a part associated with a trolley carriage that is operated by a door opener. Pivotably providing a second arm with the first arm. Providing a motive member configured or configurable to provide a motive force capable of pivoting or keeping a first arm engaging portion and a second arm engaging portion in a closed positioned so that the first arm engaging portion and the second arm engaging portion are engaged with a component associated with a door bracket. The motive force can be configured to be not sufficient to keep at least one of the first arm engaging portion and the second arm engaging portion in the closed position upon encountering a predetermined pulling force associated with the component.

There has thus been outlined, rather broadly, features of the present technology in order that the detailed description thereof that follows may be better understood and in order that the present contribution to the art may be better appreciated.

In some embodiments of the present technology, the moving member can be a garage door trolley, and the moveable member is a garage door arm.

Some embodiments can include a plunger slidably receivable in a main bore defined in the housing. The plunger can include a plunger shaft slidably receivable through a shaft bore defined through an end of the housing. The plunger shaft can be connectable to the garage door trolley.

Some embodiments can include a pair of springs oppositely positioned against the plunger.

Some embodiments can include a spring pin received through the housing, where the spring pin can be configured to hold at least one of the springs in place.

In some embodiments of the present technology, the main bore can be configured to receive a portion of the garage door arm.

In some embodiments of the present technology, the housing can include one or more slots defined in the housing and in communication with the main bore.

In some embodiments of the present technology, the ball bore can be configured to protrude a portion of the ball into one of the slots or into the main bore.

In some embodiments of the present technology, the ball bore can include a first open end configured to receive a setscrew to hold the biasing member against the ball.

In some embodiments of the present technology, the ball bore can include a second open end having a size smaller than the ball bore. The size of the second open end can allow the portion of the ball therethrough while preventing a remaining portion of the ball from passing therethrough.

In some embodiments of the present technology, the slots can be configured to slidably receive an arm pin associated with the garage door arm. A portion of the ball can be configured to contact the arm pin.

In some embodiments of the present technology, a portion of the ball can be receivable in a bore or recess defined in the garage door arm.

In some embodiments of the present technology, the motive force provided by the motive member is not sufficient to keep at least one of the first arm engaging portion and the second arm engaging portion in the closed position upon encountering a predetermined pulling or pushing force associated with the component.

In some embodiments of the present technology, the motive member can be configured or configurable to release the second arm engaging portion from the first arm engaging portion upon encountering a predetermined pulling or pushing force associated with the component.

In some embodiments of the present technology, the motive member can be selected from the group consisting of at least one magnet, and at least one spring.

In some embodiments of the present technology, the first arm can include a first arm connection portion attachable to a trolley or carriage associated with the door opener, with the first arm engaging portion attachable to the component being a member associated with a door bracket of the door.

In some embodiments of the present technology, the first arm engaging portion can define a first arm notch configured to pivotably receive at least a first portion of the member, and wherein the second arm engaging portion can define a second arm notch configured to pivotably receive at least a second portion of the member.

In some embodiments of the present technology, the first arm can include a first arm connection portion attachable to a door bracket of the door, with the first arm engaging portion attachable to the component being a member of a trolley or associated with the door opener.

In some embodiments of the present technology, the first arm engaging portion can define a first arm notch configured to pivotably receive at least a first portion of the member, and wherein the second arm engaging portion can define a second arm notch configured to pivotably receive at least a second portion of the member.

In some embodiments of the present technology, the first arm engaging portion can define a first arm notch configured to pivotably receive at least a first portion of the component, and wherein the second arm engaging portion can defined a second arm notch configured to pivotably receive at least a second portion of the component.

In some embodiments of the present technology, the first arm can be a pair of first arms in a spaced apart relationship, and at least a part of the second arm can be receivable in a space defined between the first arms.

In some embodiments of the present technology, the first arms can include a connection section bridging the first arms between a pivot point associated with the second arm and the first arm notch.

In some embodiments of the present technology, the motive member can be a magnet associated with the connection section and a surface of the second arm between the pivot point and the second arm engaging portion.

Some embodiments of the present technology can include a spring configured or configurable to pivot the second arm about the pivot point so the second arm engaging portion is biased toward the first arm engaging portion.

In some embodiments of the present technology, the first arm can include a second connection section bridging the first arms. The second arm can include a second arm end section providing the pivot point between the second arm engaging portion and the second arm end section. The spring can be located between the second connection section and the second arm end section.

In some embodiments of the present technology, the second arm can be a pair of second arms in a spaced apart relationship, and at least a part of the first arm can be receivable in a space defined between the second arms.

In some embodiments of the present technology, the second arms can include a connection section bridging the second arms between a pivot point associated with the second arm and the second arm notches.

In some embodiments of the present technology, the motive member can be a magnet associated with the connection section and a surface of the first arm between the pivot point and the first arm engaging portion.

In some embodiments, the present technology connects a trolley or carriage associated with a garage door opener with a garage door.

Some embodiments of the present technology can include a spring configured or configurable to pivot the second arms about the pivot points so the second arm engaging portion of each of the second arms are biased toward the first arm engaging portion.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel automatic disengaging linkage system and method that has all of the advantages of the known garage door linkages or J-arms and none of the disadvantages.

It is another object of the present technology to provide a new and novel automatic disengaging linkage system and method that may be easily and efficiently manufactured and marketed.

An even further object of the present technology is to provide a new and novel automatic disengaging linkage system and method that has a low cost of manufacture with regard to both materials and labor, and which accordingly is then susceptible of low prices of sale to the consuming public, thereby making such automatic disengaging linkage system and method economically available to the buying public.

Still another object of the present technology is to provide a new automatic disengaging linkage system and method that provides in the apparatuses and methods of the known garage door linkages some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIG. 7 is a perspective view of an alternative clamping magnetic linkage system of the present technology.

FIG. 8 is a cross-sectional view of the alternative clamping magnetic linkage system in a closed and open position taken along line 8-8 in FIG. 7.

FIG. 9 is a cross-sectional view of the alternative clamping magnetic linkage system taken along line 9-9 in FIG. 8.

FIG. 13 is a perspective view of an alternative spring biased linkage system of the present technology.

FIG. 14 is a cross-sectional view of the alternative spring biased linkage system in a closed position taken along line 14-14 in FIG. 13.

FIG. 15 is a cross-sectional view of the alternative biased linkage system of FIG. 14 in an open position.

FIG. 16 is a perspective view of an alternative spring biased linkage system of the present technology.

FIG. 17 is a bottom elevational view of the alternative spring biased linkage system of FIG. 16.

FIG. 18 is a cross-sectional view of the alternative spring biased linkage system in a closed and open position taken along line 18-18 in FIG. 16.

FIG. 19 is a perspective view of the straight bar linkage system of the present technology.

FIG. 20 is a cross-sectional view of the straight bar linkage system in a closed position taken along line 20-20 in FIG. 19.

FIG. 21 is a cross-sectional view of the straight bar linkage system of FIG. 20 in an open position.

The same reference numerals refer to the same parts throughout the various figures.

DETAILED DESCRIPTION OF THE PREFERRED EMBODIMENTS

Figure 1:
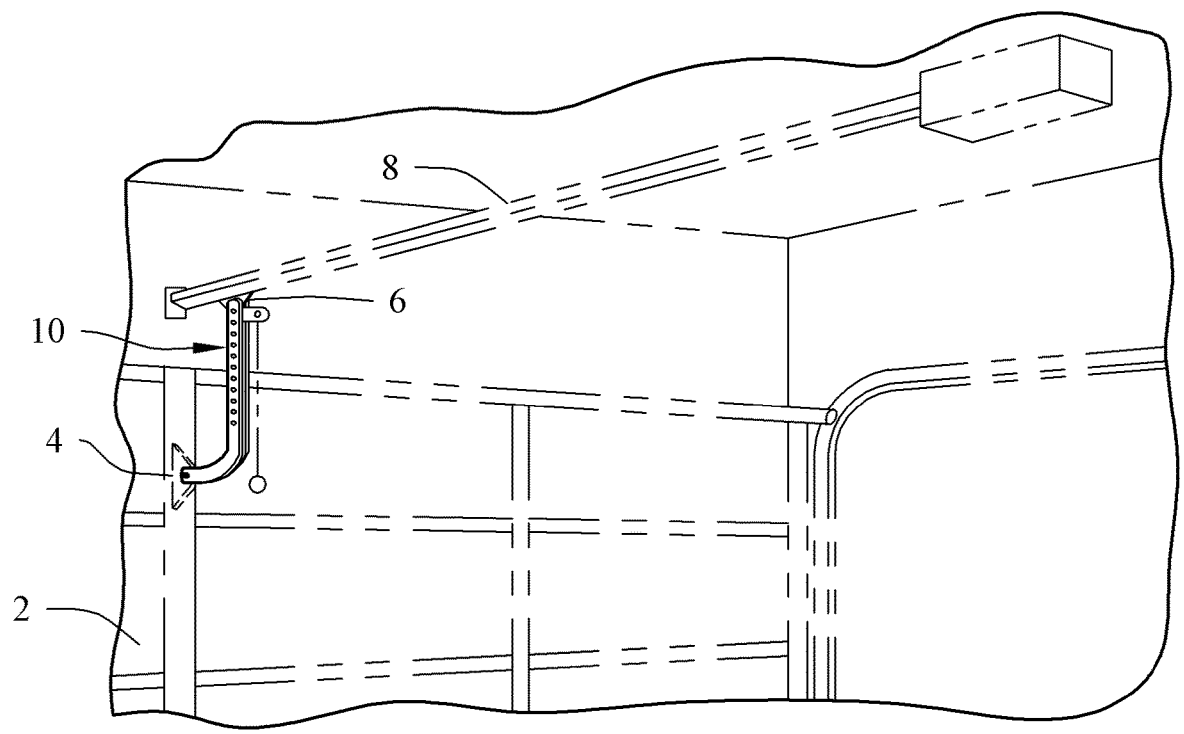
FIG. 1 is a perspective view of an embodiment of the automatic disengaging linkage system and method constructed in accordance with the principles of the present technology, with the phantom lines depicting environmental structure and forming no part of the claimed present technology.

Referring now to the drawings, and particularly to FIGS. 1-30, an embodiment of the automatic disengaging linkage system and method of the present technology is shown and generally designated by the reference numeral 10.

The majority of overhead doors 2 include multiple door panel sections that are hinged together and which travel along parallel side tracks or rails from a closed vertical position to an open horizontal position. These overhead doors normal utilize a torsion spring connected to a shaft, which supplies the force to counter balance the door during the opening operation. The spring has a life cycle and will break or fail when reached.

As best illustrated in FIG. 1, a motorized garage door opener is commonly utilized to raise and lower the garage door 2 to and from the closed and open positions. These garage door openers can utilize a horizontal track or power screw 8, which upon operation by a motor, moves a trolley or carriage therealong. The trolley can include a coupler or bracket 6, with one end of a linkage pivotably coupled thereto. The linkage is most commonly known as a J-arm. An opposite end of the J-arm is pivotably coupled to a garage door bracket 4. The J-arm can feature multiple mounting holes to provide adjustability in mounting to the trolley coupler 6 and/or the door bracket 4.

When the spring fails, the user will call a garage door technician to make a house-call to replace the broken spring. Without the counterweight force supplied by the spring, the garage door 2 becomes very heavy and should not be opened by the motorized garage door opener. Many users are not able to manually lift the full weight of the garage door 2 because the counter weight spring is not providing the counter lifting force.

It is ill advised to operate the garage door opener with a broken counterweight spring, the garage door rollers obstructed or the trolley pulling at least a substantial weight of the garage door. This is because the J-arm provides a mechanical linkage between the garage door 2 and the opener, and operation of the garage door opener would attempt to lift the garage door. Typically, the garage door opener or motor unit thereof is not strong enough to lift the full weight of the garage door, and this lifting operation can cause damage to the garage door hardware or panels, the trolley coupler, and/or the motor or gearing of the garage door opener.

With above in mind, it can be appreciated in the exemplary, that normal lifting and/or lowering operations of the garage door utilizing the garage door opener can include, but not limited to, a non-broken counterweight spring, the garage door rollers not being obstructed, a predetermined weight or force imparted onto the linkage system, and/or a predetermined pulling force acting between the first and second arms of the linkage system. It can further be appreciated, in the exemplary, that non-normal lifting and/or lowering operations of the garage door can include, but not limited to, a broken counter weight spring, a garage door roller being obstructed or restricted, a pulling force on the linkage system greater than a predetermined force, and/or a pulling force between the first and second arms of the linkage system greater than a predetermined force.

In FIGS. 1-21, a new and novel automatic disengaging linkage system and method 10 of the present technology for preventing a garage door and/or opener from being damage due to spring failure or roller obstruction by releasing a J-arm from the door bracket or door bracket or trolley coupler is illustrated and will be described.

Figure 2:
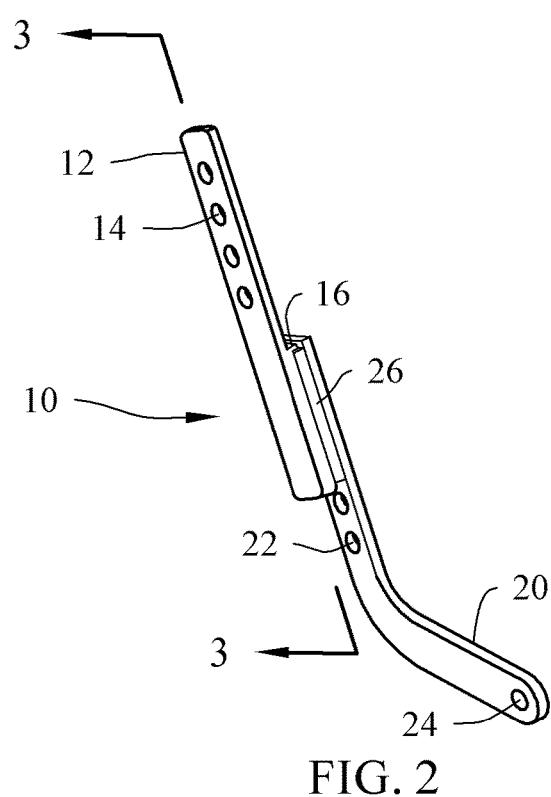
FIG. 2 is a perspective view of the magnetic automatic disengaging linkage system of the present technology.
Figure 3:
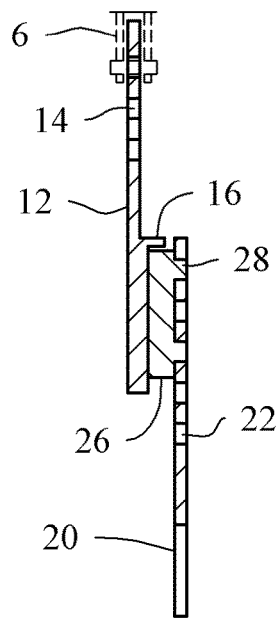
FIG. 3 is a cross-sectional view of the magnetic automatic disengaging linkage system of FIG. 2 taken along line 3-.

Referring to FIGS. 2 and 3, the automatic disengaging linkage system 10 can be a magnetic linkage system including a first arm 12 separably connected to a second arm 20 by way of a motive member, such as but not limited to, a magnet 26. The first arm 12 can in include multiple mounting holes 14 defined therethrough along a longitudinal length of the first arm. The mounting holes 14 are each configured to receive a mounting pin associated with the trolley coupler 6. The first arm 12 can further include a lip 16 extending from a side thereof.

The second arm 20 can have a general J-shape with first and second sections being angularly related. The first section can include multiple magnet holes 22 defined therethrough, and the second section can include at least one mounting hole 24 defined therethrough. The mounting hole 24 can be located near a free end of the second section, and is configured to receive a mounting pin associated with the door bracket 4.

The magnet 26 can include at least one protrusion 28 configured to be received in at least one of the magnet holes 22 of the first section. The magnet 26 can be positioned on the second arm 20 in a variety of locations, thereby providing adjustability to accommodate different size and shape magnets 26. It can be appreciated that the magnet holes 22, in the alternative, can be protrusions, and the magnet protrusions 28, in the alternative, can be mounting holes or divots. This arrangement connects the magnet 26 to the second arm 20, and can provide stability for the magnet 26.

In use, the first and second arms 12, 20 are joined together so that a free side of the magnet 26 comes in contact with a section of the first arm 12 so that an end of the magnet 26 is adjacent the lip 16, with the second section of the second arm 20 extending away from the first arm 12 to form a general J-shape. The magnetic attraction force of the magnet 26 joins the first and second arms 12, 20 together to form an integral J-arm.

The mounting hole 24 of the second arm 20 is pivotably connected to the door bracket 4, and one of the mounting holes 14 of the first arm 12 is pivotably connected to the trolley coupler 6. The magnetic attraction force provided by the magnet 26 is configured, determined or configurable to be sufficient to keep the first and second arms 12, 20 joined together during normal lifting and/or lower operations provided by the garage door opener, with an intact (non-broken) counterweight spring or freely traveling garage door rollers. However, the magnetic attraction force provided by the magnet 26 is further configured, determined or configurable to not be sufficient to keep the first and second arms 12, 20 joined together during non-normal lifting and/or lower operations of the garage door 2, with a broken counterweight spring or obstructed garage door roller. The magnet 26 is configured to separate from the first arm 12 upon a predetermined pulling force created by a weight of the garage door 2, a downward force of the garage door or pulling by movement of the trolley coupler due to operation of the garage door opener.

With the garage door 2 in the lowered position, and the first and second arms 12, 20 connected together, the lip 16 prevents the garage door 2 from being raised manually while the garage door opener is not in operation. The lip 16 prevents the magnet 26, and consequently the second arm 20, from sliding past and separating from the first arm 12 due to an unwanted lifting force by the garage door. It can be appreciated that the lip 16 can extend over a free end of the first section of the second arm 20.

Figure 4:
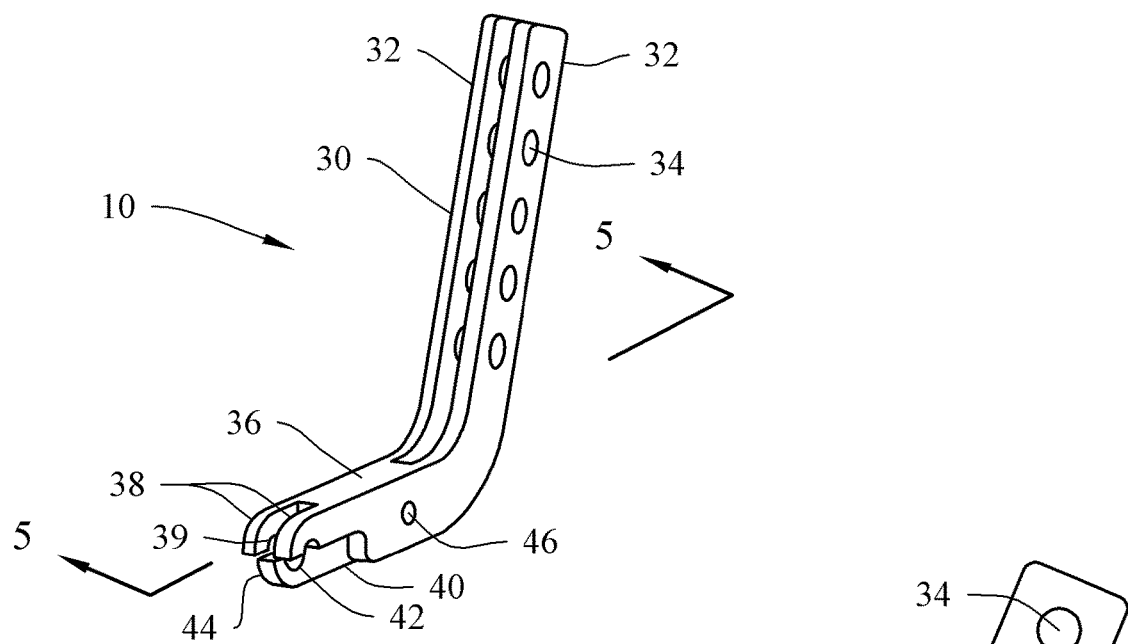
FIG. 4 is a perspective view of the clamping magnetic linkage system of the present technology.
Figure 6:
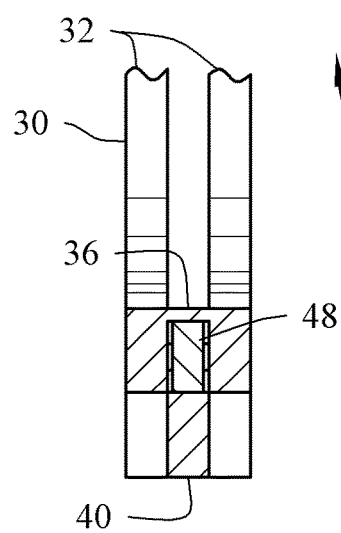
FIG. 6 is a cross-sectional view of the clamping magnetic linkage system taken along line 6-6 in FIG. 5.
Figure 5:
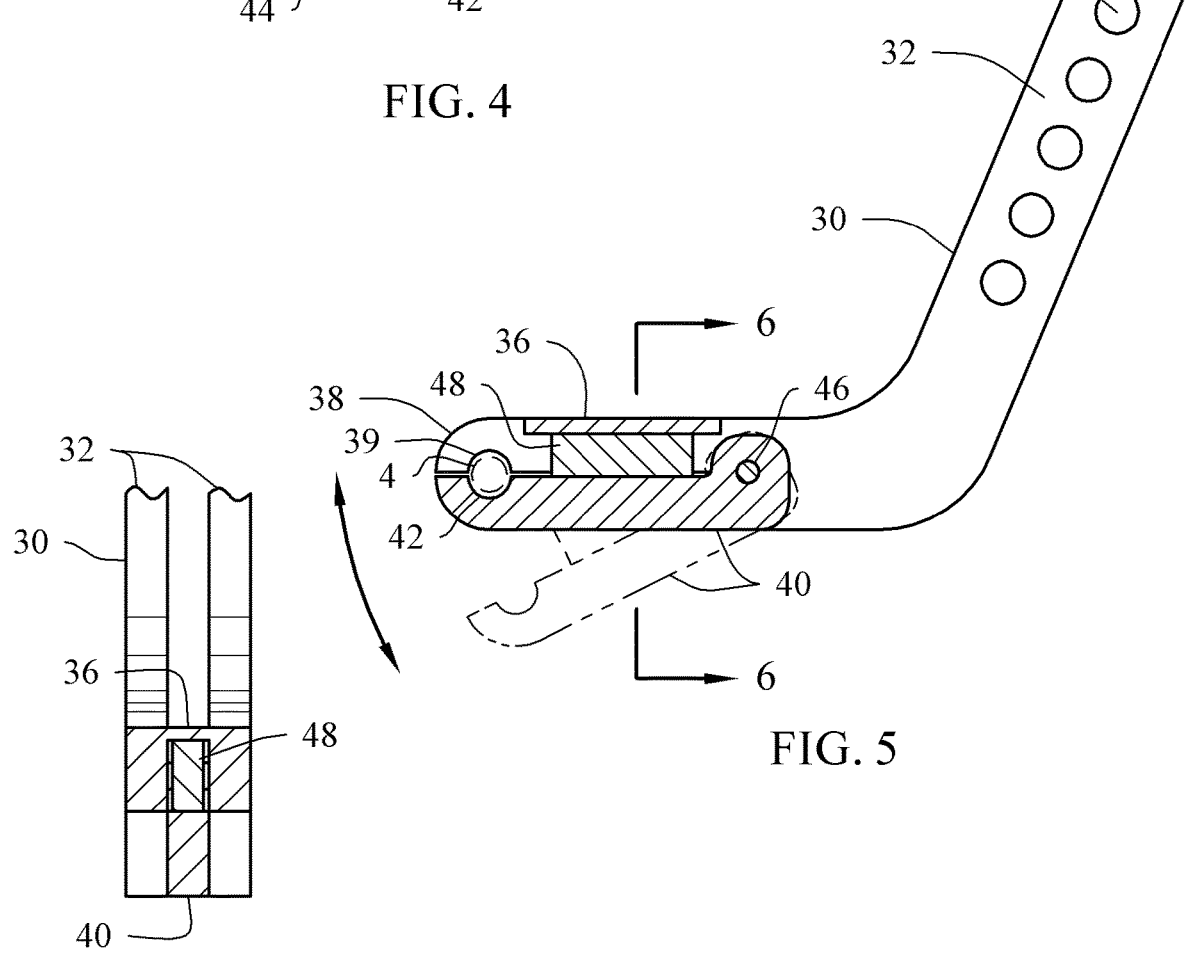
FIG. 5 is a cross-sectional view of the clamping magnetic linkage system in a closed and open position taken along line 5-5 in FIG. 4.

Referring to FIGS. 4-6, the automatic disengaging linkage system 10 can be a clamping magnetic linkage system including a first arm 30 pivotably connected with a second arm 40. The first arm 30 can have a generally J-shape including a pair of parallel first arm sections 32, and a pair of parallel second arm sections 38 including a connection section 36 bridging the pair of second arm sections 38. The first arm sections each include multiple and aligned mounting holes 34 defined therethrough along a longitudinal length of the first arm sections. The pair of first arm sections 32 are configured to receive a portion of the trolley coupler therebetween, with the mounting holes 34 each being configured to receive a mounting pin associated with the trolley coupler.

The first arm sections 32 and the second arm sections 38 are angularly related to each other to form a general J-shape. The second arm sections 38 can include a rounded or curved end, with a notch 39 defined in each of the first arm sections 32 adjacent the curved end and facing away from the connection section 36. The curved end can be associated with a first portion of the second arm sections 38 that has a height less than a second portion of the second section 38 that transitions to the first arm section 32. This difference in height creates a cutout adjacent the curved ends, with the notches 39 in communication with the cutout.

The second arm 40 is sized to be receivable between the pair of second arm sections 38 of the first arm 30, with a first end configured of the second arm 40 being pivotably coupled to a pivot pin 46 passing through, extending from or associated with at least one of the second arm sections 38. The second arm 40 can include a rounded or curved end, with a notch 42 defined therein adjacent the curved end and facing toward the notch 39 of the second arm section 38. The pivot pin 46 allows the second arm 40 to pivot in and out of a space defined between the pair of second arm sections 38 so that the first arm notches 39 and the second arm notch 42 are in communication with each other and capable of receiving the door bracket pin 4 or the trolley carriage pin 6.

A motive member, such as but not limited to, a magnet 48 can be attached, fitted or mounted to an interior side of the second arm 40 capable of contacting an interior side of the second connection section 36 of the first arm 30, in between the pair of the second arm sections 38. Alternatively, the magnet 48 can be attached, fitted or mounted to the interior side of the connection section 36 of the first arm 30, in between the pair of the second arm sections 38, capable of contacting the interior side of the second arm 40. The magnet 48 is configured to be located between the second arm notch 42 and the pivot pin 46. The magnetic attraction force of the magnet 48 keeps the second arm 40 in the closed position so that a door bracket mounting pin 4 is received in the first arm notches 39 and the second arm notch 42, thereby clamping the linkage system 10 to the door bracket mounting pin 4, as best illustrated in FIG. 5.

The magnetic attraction force provided by the magnet 48 is configured, determined or configurable to be sufficient to keep the second arm 40 in the closed position during normal lifting and/or lower operations provided by the garage door opener, with an intact (non-broken) counterweight spring or freely traveling garage door rollers. However, the magnetic attraction force provided by the magnet 48 is further configured, determined or configurable to not be sufficient to keep the second arm 40 in the closed position during non-normal lifting and/or lower operations of the garage door 2, with a broken counterweight spring or obstructed garage door roller. The magnet 48 is configured to allow the second arm 40 to pivot away from the first arm 30, and thus releasing the door mounting pin 4, upon a predetermined pulling force created by a weight of the garage door 2, a downward force of the garage door or pulling by movement of the trolley coupler due to operation of the garage door opener.

Referring to FIGS. 7-9, the automatic disengaging linkage system 10 can be an alternate embodiment clamping magnetic linkage system including a first arm 50 pivotably connected with a second arm 60. The first arm 50 can include a first arm section 51 angularly related with a second arm section 54 to form a general J-shape. The first arm section 51 can include multiple mounting holes 52 defined therethrough along a longitudinal length of the first arm section, and configured to receive a mounting pin associated with the trolley coupler.

The second arm section 54 of the first arm 50 can include a rounded or curved end portion, with a notch 56 defined therein adjacent the curved end. The curved end portion can have a height less than a second portion of the second arm section 54 that transitions to the first arm section 51. This difference in height creates a cutout adjacent the curved ends, with the notch 56 in communication with the cutout.

The second arm 60 can include a pair of parallel second arm members 60, and a connection section 66 bridging the pair of second arm members 60, as best illustrated in FIGS. 8 and 9. A space is defined between the pair of second arm members 60, which can be sized to receive at least a portion of the second arm section 54 of the first arm 50 when the second arm 60 is in a closed position. Alternatively, the space defined between the pair of second arm members 60 can be sized so that the second arm section 54 of the first arm 50 is not capable of being received in the space.

Each of the second arm members 60 can include a first end 62 and a second end 64. The first end 62 of the second arm members 60 can be pivotably coupled to a pivot pin 58 passing through, extending from or associated with the first arm section 51 or the second arm section of the first arm 50. The first end 62 can have a height larger than that of the second end 64 to accommodate receipt of the pivot pin 58. The second end 64 can include a rounded or curved end side, and a notch 42 can be defined therein adjacent the curved end side and facing toward the notch 56 of the second arm section 54 of the first arm 50. The pivot pin 58 allows the second arm members 60 to pivot so that the first arm notch 56 and the second arm notches 65 are in communication with each other and capable of receiving the door bracket pin 4 or the trolley carriage pin 6

A motive member, such as but not limited to, a magnet 68 can be attached, fitted or mounted to an interior side of the connection section 66 of the second arm 60, in between the pair of the second arm members 60. The magnet 68 is sized and locatable in the space defined between the second arm members 60, and between the second arm 65 and the pivot pin 58. Alternatively, the magnet 68 can be attached, fitted or mounted to an interior side of the second arm section 54 of the first arm 50, so as to be receivable between the pair of the second arm members 60, and capable of contacting the interior side of the connection section 66 of the second arm 60. The magnetic attraction force of the magnet 68 keeps the second arm members 60 in the closed position so that the door bracket mounting pin 4 is received in the first arm notch 56 and the second arm notches 65, thereby clamping the linkage system 10 to the door bracket mounting pin 4, as best illustrated in FIG. 8.

The magnetic attraction force provided by the magnet 68 is configured, determined or configurable to be sufficient to keep the second arm 60 in the closed position during normal lifting and/or lower operations provided by the garage door opener, with an intact (non-broken) counterweight spring or freely traveling garage door rollers. However, the magnetic attraction force provided by the magnet 68 is further configured, determined or configurable to not be sufficient to keep the second arm 60 in the closed position during non-normal lifting and/or lower operations of the garage door 2, with a broken counterweight spring or obstructed garage door roller. The magnet 68 is configured to allow the second arm 60 to pivot away from the first arm 50, and thus releasing the door mounting pin 4, upon a predetermined pulling force created by a weight of the garage door 2, a downward force of the garage door or pulling by movement of the trolley coupler due to operation of the garage door opener, as best illustrated in FIG. 12.

Figure 10:
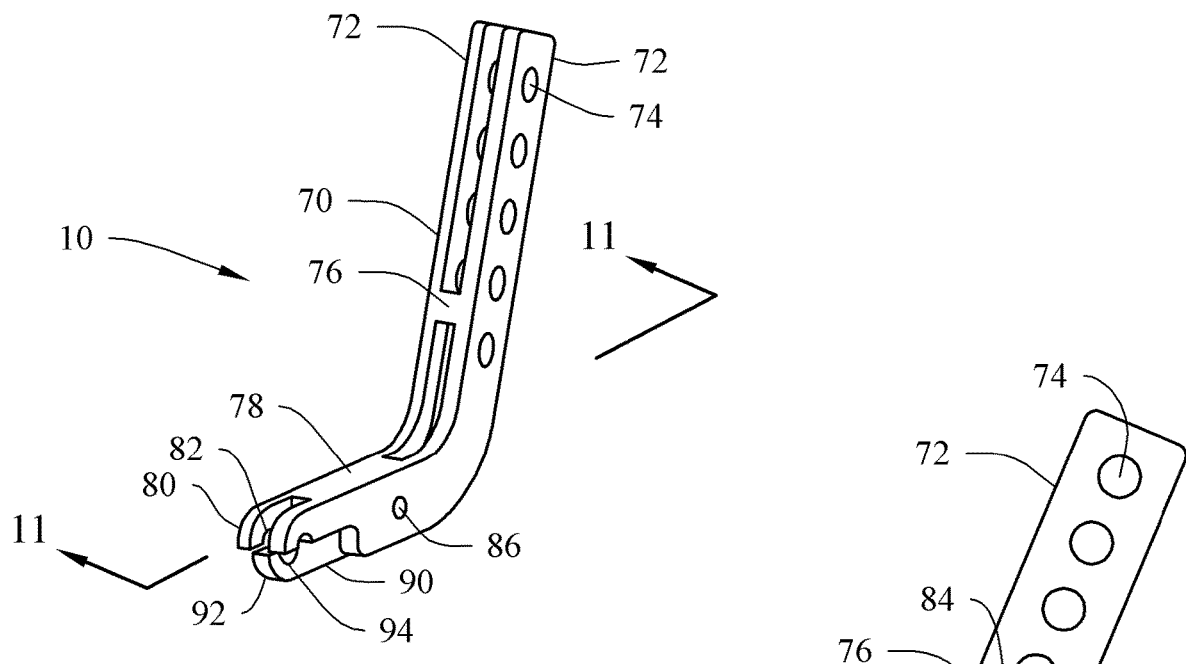
FIG. 10 is a perspective view of the spring biased linkage system of the present technology.
Figure 11:
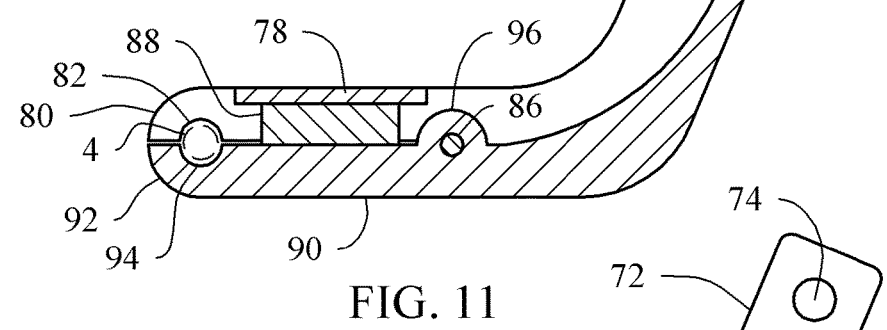
FIG. 11 is a cross-sectional view of the spring biased linkage system in a closed position taken along line 11-11 in FIG. 10.
Figure 12:
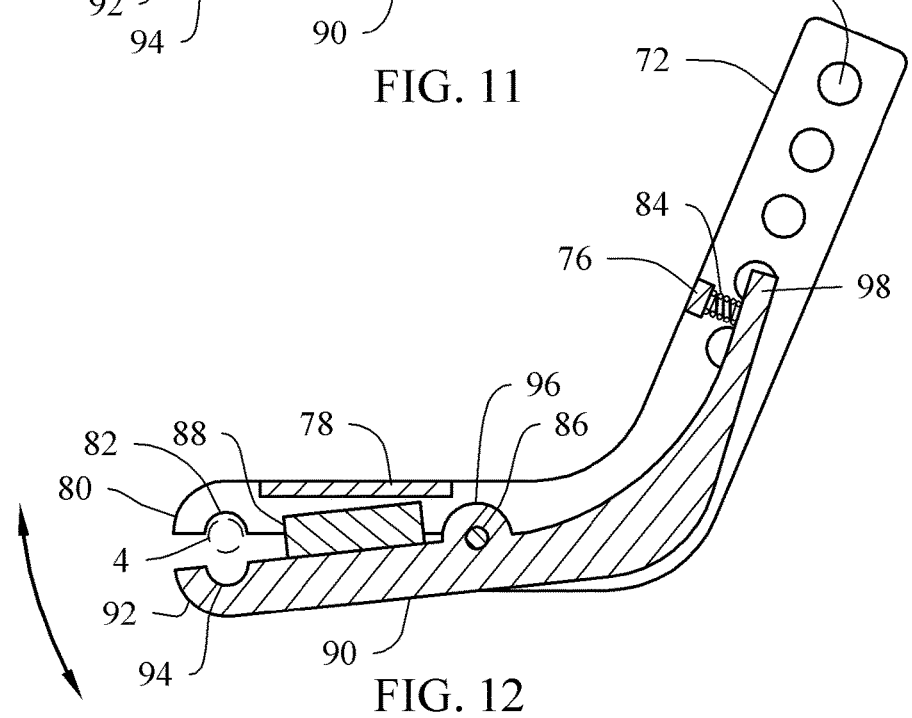
FIG. 12 is a cross-sectional view of the spring biased linkage system of FIG. 11 in an open position.

Referring to FIGS. 10-12, the automatic disengaging linkage system 10 can be a spring biased magnetic linkage system including a first arm 70 pivotably connected with a second arm 90. The first arm 70 can have a generally J-shape including a pair of parallel first arm sections 72 including a first connection section 76 bridging the pair of first arm sections 72, and a pair of parallel second arm sections 80 including a second connection section 78 bridging the pair of second arm sections 80. The first arm sections each include multiple and aligned mounting holes 74 defined therethrough along a longitudinal length of the first arm sections. The pair of first arm sections 72 are configured to receive a portion of the trolley coupler therebetween, with the mounting holes 74 each being configured to receive a mounting pin associated with the trolley coupler.

The first arm sections 72 and the second arm sections 80 are angularly related to each other to form a general J-shape. The second arm sections 80 can include a rounded or curved end, with a notch 82 defined in each of the first arm sections 80 adjacent the curved end and facing away from the connection section 78. The curved end can be associated with a first portion of the second arm sections 80 that has a height less than a second portion of the second section 80 that transitions to the first arm section 72. This difference in height creates a cutout adjacent the curved ends, with the notches 82 in communication with the cutout.

The second arm 90 is sized to be receivable between the pair of second arm sections 80 of the first arm 70, with a first end configured of the second arm 90 being pivotably coupled to a pivot pin 86 passing through, extending from or associated with at least one of the second arm sections 80.

The second arm 90 includes a first section 92, an intermediate section 96, and a second section 98. The first section 92 can feature a rounded or curved end corresponding with but a mirror configuration of the curved ends of the second arm sections 80 of the first arm 70. A notch 94 can be defined in the first arm section 92 adjacent the curved end and facing toward the notches 82 of the second arm sections 80 of the first arm 70.

The intermediate section 96 can be an enlarged section configured to create an increased area of the second arm 90 that can accommodate receipt of the pivot pin 86. The pivot pin 86 allows the second arm 90 to pivot in and out of a space defined between the pair of second arm sections 80 so that the first arm notches 82 and the second arm notch 94 are in communication with each other in a closed position and capable of receiving the door bracket pin 4 or the trolley carriage pin 6.

The second arm section 98 of the second arm 90 angularly transitions from the intermediate section 96 so that at least and end of the second arm section 98 can extend into the space defined between the pair of first arm sections 72 of the first arm 70 and be adjacent to or alignable with the first connection section 76 of the first arm 70.

A motive member, such as but not limited to, a biasing member or spring 84 is located or fitted between the first connection section 76 and a portion of the second arm section 98. The spring 84 can be a compression spring providing an outward force that pushes the second arm section 98 away from the first connection section 76. This results in a pivoting moment of the second arm 90 about the pivot pin 86, which consequently moves the first arm section 92 of the second arm 90 toward the second arm section 80 of the first arm 70, and thereby closing or clamping the door bracket mounting pin 4. It can be appreciated that the spring 84 can be, but not limited to, a compression spring, a leaf spring, an inflatable member, a pneumatic or hydraulic biasing member, an elastomeric member, or a solenoid.

A motive member, such as but not limited to, a magnet 88 can be attached, fitted or mounted to an interior side of the second arm 90 capable of contacting an interior side of the second connection section 78 of the first arm 70, in between the pair of the second arm sections 80. Alternatively, the magnet 88 can be attached, fitted or mounted to the interior side of the second connection section 78 of the first arm 70, in between the pair of the second arm sections 80, capable of contacting the interior side of the second arm 90. The magnet 88 is configured to be located between the second arm notch 94 and the pivot pin 86. The magnetic attraction force of the magnet 88 keeps the second arm 90 in the closed position so that the door bracket mounting pin 4 is received in the first arm notches 82 and the second arm notch 94, thereby clamping the linkage system 10 to the door bracket mounting pin 4, as best illustrated in FIG. 11.

It can further be appreciated that the first connection section 76, the spring 84 and the portion of the second arm section 98 of the second arm 90 in contact with the spring 84 can be located anywhere on the second arm section 98 that is capable of providing a pivoting action of the second arm 90. It can yet further be appreciated that the spring 84 can be a tensioning element or spring that is capable of pulling the first arm section 92 so as to create a pivoting action of the second arm 90 about the pivot pin 86. Such a tensioning spring would be associated with the first arm section 92, thereby eliminating the need for the second arm section 98.

The force of the spring 84 and/or the magnetic attraction force provided by the magnet 88 are configured, determined or configurable to be sufficient to keep the second arm 90 in the closed position during normal lifting and/or lower operations provided by the garage door opener, with an intact (non-broken) counterweight spring or freely traveling garage door rollers. However, the magnetic attraction force provided by the magnet 88 is further configured, determined or configurable to not be sufficient to keep the second arm 90 in the closed position during non-normal lifting and/or lower operations of the garage door 2, with a broken counterweight spring or obstructed garage door roller. The magnet 88 is configured to allow the first arm section 92 of the second arm 90 to pivot away from the second arm sections 80 of the first arm 70, and thus releasing the door mounting pin 4, upon a predetermined pulling force created by a weight of the garage door 2, a downward force of the garage door or pulling by movement of the trolley coupler due to operation of the garage door opener.

Referring to FIGS. 13-15, the automatic disengaging linkage system 10 can be a spring biased magnetic linkage system including a first arm 100 pivotably connected with a second arm 116. The first arm 100 can have a generally J-shape including a pair of parallel first arm sections 102 including a first connection section 106 bridging the pair of first arm sections 102, and a pair of parallel second arm sections 108 including a second connection section 112 bridging the pair of second arm sections 108. The first arm sections 102 each include multiple and aligned mounting holes 104 defined therethrough along a longitudinal length of the first arm sections. The pair of first arm sections 102 are configured to receive a portion of the trolley coupler therebetween, with the mounting holes 104 each being configured to receive a mounting pin associated with the trolley coupler.

The first arm sections 102 and the second arm sections 108 are angularly related to each other to form a general J-shape. The second arm sections 108 can include a rounded or curved end, with a notch 110 defined in each of the first arm sections 108 adjacent the curved end and facing away from the connection section 112. The curved end can be associated with a first portion of the second arm sections 108 that has a height less than a second portion of the second section 108 that transitions to the first arm section 102. This difference in height creates a cutout adjacent the curved ends, with the notches 110 in communication with the cutout.

The second arm 116 is sized to be receivable between the pair of second arm sections 108 of the first arm 100, and includes a first arm section 118 and a second arm section 120. An intermediate section between the first arm section 118 and arm second end section 120 can be pivotably coupled to a pivot pin 126 passing through, extending from or associated with at least one of the second arm sections 108.

The first arm section 118 of the second arm 116 angularly transitions from the intermediate section so that at least and end of the first arm section 118 can extend into the space defined between the pair of first arm sections 102 of the first arm 100. A surface of the first arm section 118 can be adjacent to or alignable with a surface of the first connection section 106 of the first arm 100.

The second arm section 120 can feature a rounded or curved end corresponding with but a mirror configuration of the curved ends of the second arm sections 108 of the first arm 100. A notch 122 can be defined in the second arm section 120 adjacent its curved end and facing toward the notches 110 of the second arm sections 108 of the first arm 100.

The intermediate section can be an enlarged section configured to create an increased area of the first arm section 118 that can accommodate receipt of the pivot pin 126. The pivot pin 126 allows the second arm 116 to pivot in and out of a space defined between the pair of second arm sections 108 so that the first arm notches 110 and the second arm notch 122 are in communication with each other in a closed position and capable of receiving the door bracket pin 4 or the trolley carriage pin 6.

A motive member, such as but not limited to, a biasing member or spring 128 is located or fitted between the surface of the first connection section 106 and the surface of the first arm section 118. The spring 128 can be a compression spring providing an outward force that pushes the first arm section 118 away from the first connection section 106. This results in a pivoting moment of the second arm 116 about the pivot pin 126, which consequently moves the second arm section 120 of the second arm 116 toward the second arm sections 108 of the first arm 100, and thereby closing or clamping the door bracket mounting pin 4. It can be appreciated that the spring 128 can be, but not limited to, a compression spring, a leaf spring, an inflatable member, a pneumatic or hydraulic biasing member, an elastomeric member, or a solenoid.

A motive member, such as but not limited to, a magnet 124 can be attached, fitted or mounted to an interior side of the second arm 116 capable of contacting an interior side of the second connection section 112 of the first arm 100, in between the pair of the second arm sections 108. Alternatively, the magnet 124 can be attached, fitted or mounted to the interior side of the second connection section 112 of the first arm 100, in between the pair of the second arm sections 108, capable of contacting the interior side of the second arm 116. The magnet 124 is configured to be located between the second arm notch 122 and the pivot pin 126. The magnetic attraction force of the magnet 124 keeps the second arm 116 in the closed position so that the door bracket mounting pin 4 is received in the first arm notches 110 and the second arm notch 122, thereby clamping the linkage system 10 to the door bracket mounting pin 4, as best illustrated in FIG. 14.

The force of the spring 128 and/or the magnetic attraction force provided by the magnet 124 are configured, determined or configurable to be sufficient to keep the second arm 116 in the closed position during normal lifting and/or lower operations provided by the garage door opener, with an intact (non-broken) counterweight spring or freely traveling garage door rollers. However, the magnetic attraction force provided by the magnet 124 is further configured, determined or configurable to not be sufficient to keep the second arm 116 in the closed position during non-normal lifting and/or lower operations of the garage door 2, with a broken counterweight spring or obstructed garage door roller. The magnet 128 is configured to allow the second arm section 120 of the second arm 90 to pivot away from the second arm sections 108 of the first arm 100, and thus releasing the door mounting pin 4, upon a predetermined pulling force created by a weight of the garage door 2, a downward force of the garage door or pulling by movement of the trolley coupler due to operation of the garage door opener.

Referring to FIGS. 16-18, the automatic disengaging linkage system 10 can be an alternate embodiment spring biased magnetic linkage system including a first arm 130 pivotably connected with a second arm 140. The first arm 130 can include a first arm section 132 angularly related with a second arm section 136 to form a general J-shape. The first arm section 132 can include multiple mounting holes 134 defined therethrough along a longitudinal length of the first arm section, and configured to receive a mounting pin associated with the trolley coupler.

The second arm section 136 of the first arm 130 can include a rounded or curved end portion, with a notch 138 defined therein adjacent the curved end. The curved end portion can have a height less than a second portion of the second arm section 136 that transitions to the first arm section 132. This difference in height creates a cutout adjacent the curved ends, with the notch 138 in communication with the cutout.

The second arm 140 can include a pair of parallel second arm members 140, and a connection section 150 bridging the pair of second arm members 140, as best illustrated in FIGS. 17 and 18. A space is defined between the pair of second arm members 140, which is sized to receive at least a portion of the second arm section 136 of the first arm 130 when the second arm 140 is in a closed position. Alternatively, the space defined between the pair of second arm members 140 can be sized so that the second arm section 136 of the first arm 130 is not capable of being received in the space.

Each of the second arm members 140 can include a first end 145 and a second end 146. The first end 145 of the second arm members 140 can be pivotably coupled to a pivot pin 154 passing through, extending from or associated with the first arm section 132 or the second arm section 136 of the first arm 130. The first end 145 can have a height larger than that of the second end 146 to accommodate receipt of the pivot pin 154. The second end 146 can include a rounded or curved end side, and a notch 148 can be defined therein adjacent the curved end side and facing toward the notch 138 of the second arm section 136 of the first arm 130. The pivot pin 154 allows the second arm members 140 to pivot so that the first arm notch 138 and the second arm notches 148 are in communication with each other in a closed position, and capable of securing or clamping a door bracket mounting pin 4.

A motive member, such as but not limited to, a U-shaped biasing member or spring 156 can include a pair of parallel end sections 158, a coiled portion 160, and a connection section 162 connecting the end sections 158. Each of the end sections 158 are engageable or contact with a post 144 extending from an exterior surface of the second arm members 140, respectively. Each coiled section 158 is configured to receive an end portion of the pivot pin 154 extend out past the exterior surface of the second arm members 140, respectively. It can be appreciated that ends of the pivot pin 154 can be received in a recess define in an interior surface of each of the second arm members 140, respectively, with a second post extending out from the exterior surface of the each of the second arm members 140 that is configured to be received in the coiled sections 160.

The connection section 162 is engaged or in contact with a side of the first arm section 132 or the second arm section 136 of the first arm 130, so as to torque the coiled section 160 of the spring 156 and create a biasing force against the post 144. This biasing force results in a pivoting moment of the second arm members 140 about the pivot pin 154, which consequently moves the second end 146 of the second arm members 140 toward the second arm section 136 of the first arm 130, and thereby closing or clamping the door bracket mounting pin 4. It can be appreciated that the spring 156 can be, but not limited to, two or more independent springs without the connection section 162.

A motive member, such as but not limited to, a magnet 152 can be attached, fitted or mounted to an interior side of the connection section 150 of the first arm 130, in between the pair of the second arm sections 138. The magnet 152 is sized and locatable in the space defined between the second arm members 140, and between the second arm notches 148 and the pivot pin 154. Alternatively, the magnet 152 can be attached, fitted or mounted to an interior side of the second arm section 136 of the first arm 130, so as to be receivable between the pair of the second arm members 140, and capable of contacting the interior side of the connection section 150 of the second arm 140. The magnetic attraction force of the magnet 152 keeps the second arm 140 in the closed position so that a door bracket mounting pin 4 is received in the first arm notch 138 and the second arm notches 148, thereby clamping the linkage system 10 to the door bracket mounting pin 4, as best illustrated in FIG. 18.

The magnetic attraction force provided by the magnet 152 is configured, determined or configurable to be sufficient to keep the second arm 140 in the closed position during normal lifting and/or lower operations provided by the garage door opener, with an intact (non-broken) counterweight spring or freely traveling garage door rollers. However, the magnetic attraction force provided by the magnet 152 is further configured, determined or configurable to not be sufficient to keep the second arm 140 in the closed position during non-normal lifting and/or lower operations of the garage door 2, with a broken counterweight spring or obstructed garage door roller. The magnet 152 is configured to allow the second ends 146 of the second arm members 140 to pivot away from the second arm section 136 of the first arm 130, and thus releasing the door mounting pin 4, upon a predetermined pulling force created by a weight of the garage door 2, a downward force of the garage door or pulling by movement of the trolley coupler due to operation of the garage door opener, as best illustrated in FIG. 18.

Referring to FIGS. 19-21, the automatic disengaging linkage system 10 can be a spring biased magnetic straight bar linkage system 170 including a first arm 172, a cover plate 176 fitted to the first arm 172 in a spaced apart relationship, and a second arm 182 pivotably movable in the space between the first arm 172 and the cover plate 176. The first arm 172 can be a generally straight or can have a generally J-shape. A plurality of mounting holes 174 are defined through the first arm 172 along a longitudinal length thereof. The mounting holes 174 each being configured to receive a mounting pin associated with the door bracket 4 or the trolley coupler 6.

The cover plate 176 is mountable to an end portion of the first arm 172 by way of one or more first mounts 178, and a pair of second pivot mounts 180. The first and second mounts 178, 180 can be, but not limited to, pins, fasteners, rods, shafts or spacers, and are configured to connect the first arm 172 and the cover plate 176 together in a spaced apart relationship.

The second arm is a pair of second arms 182 each being receivable in the space between the first arm 172 and the cover plate 176, and each being pivotably coupled to one of the second pivot mounts 180. Each of the second arms 182 include a first arm section 184 substantially exterior of the first arm 172 and the cover plate 176, and a second arm section 188 interior of the first arm 172 and the cover plate 176.

The first arm section 184 of each of the second arms 182 can include a rounded or curved end, and a notch 186 can be defined in each of the first arm sections 184 adjacent the curved end. The notches 186 face each other, in a mirror like arrangement, to form a clamping jaw when the second arms 182 are in a closed position, as best illustrated in FIG. 20.

The second arm section 188 of each of the second arms 182 has a height less than the first arm section 184 that it transitions from. This difference in height creates a cutout adjacent or near the pivot mount 180.

The second arm sections 188 are sized to be movably receivable between the first arm 172 and the cover plate 176 so that a free end of the second arm sections 188 are capable of pivoting toward each other without obstruction from the first mounts 178. In each of the second arms 182, the pivot mount 180 is located in an intermediate section between the first arm section 182 and the second arm section 188, thereby providing opposite pivoting motion between the first arm section 182 and the second arm section 188. The pivot mounts 180 allows first arm sections of the second arms 182 to pivot toward and away from each other so that the notches 186 are in communication with each other and capable of receiving the door bracket pin 4 or the trolley carriage pin 6.

A motive member, such as but not limited to, a biasing member or spring 190 is located or fitted between the second arm sections 188 of the second arms 182. The spring 190 can be a compression spring providing an outward force that pushes the second arm sections 188 away from each other. This can result in a pivoting moment of the second arm 182 about the pivot mount 180, which consequently moves the first arm sections 184 toward each other, and thereby closing or clamping the door bracket mounting pin 4 or the trolley carriage pin 6. It can be appreciated that the spring 190 can be, but not limited to, a compression spring, a leaf spring, an inflatable member, a pneumatic or hydraulic biasing member, an elastomeric member, or a solenoid. Each of the ends of the spring 190 can receive a protrusion extending from the second arm section 188, respectively.

It can be appreciated that the spring 190 and the portion of the second arm sections 188 of the second arm 182 in contact with the spring 190 can be located anywhere on the second arm sections 188 that is capable of providing a pivoting action of the second arm 182. Still further, it can be appreciated that the compression spring can be a pair of compression springs associated with each of the first arm sections 184 configured to push the first arms sections 184 together, thereby eliminating the need for the second arm sections 188. It can yet further be appreciated that the spring 190 can be a pair of tensioning elements or springs, each being capable of pulling the second arm sections 188 away from each other so as to create a pivoting action of the second arm 182 about the pivot mount 180.

The biasing force of the spring 190 is configured, determined or configurable to be sufficient to keep the first arm sections 184 of the second arms 182 in the closed position during normal lifting and/or lower operations provided by the garage door opener, with an intact (non-broken) counterweight spring or freely traveling garage door rollers. However, the biasing force provided by the spring 190 is further configured, determined or configurable to not be sufficient to keep the first arm sections 184 of the second arms 182 in the closed position during non-normal lifting and/or lower operations of the garage door 2, with a broken counterweight spring or obstructed garage door roller. The spring 190 is configured to allow the first arm sections 184 of the second arms 182 to pivot away from each other, as best illustrated in FIG. 21, and thus releasing the door bracket pin 4 or the trolley carriage pin 6, upon a predetermined pulling force created by a weight of the garage door 2, a downward force of the garage door or pulling by movement of the trolley coupler due to operation of the garage door opener.

It can be appreciated that a magnet (not shown) can be utilized with one or both of the first arm sections 184 to provide an attraction force to keep the first arm sections 184 together. The magnetic attraction force of the magnet is capable of keeping the first arm sections 184 in the closed position so that the door bracket mounting pin 4 or the trolley carriage pin 6 is received in the notches 186, thereby clamping the linkage system 10 to the door bracket mounting pin 4 or the trolley carriage pin 6.

Alternatively, a pair of magnets (not shown) can be utilized with each of the second arm sections 188, with or without the spring 190, in a configuration so that similar poles of each of the magnets are facing each other, thereby creating a repulsive force at a predetermined distance. This repulsive force is configured to pivot the second arms 182 about their pivot mounts 180 forcing the first arm sections 182 to the closed position.

In use, it can now be understood that in any of the embodiments of the present technology, the linkage system 10 is capable of connecting the door bracket 4 of the garage door 2 with the trolley carriage 6 of the garage door opener 8, and providing an automatic disengagement between the door bracket 4 and the trolley carriage 6 when the linkage system encounters a predetermined pulling or separating force.

Figure 22:
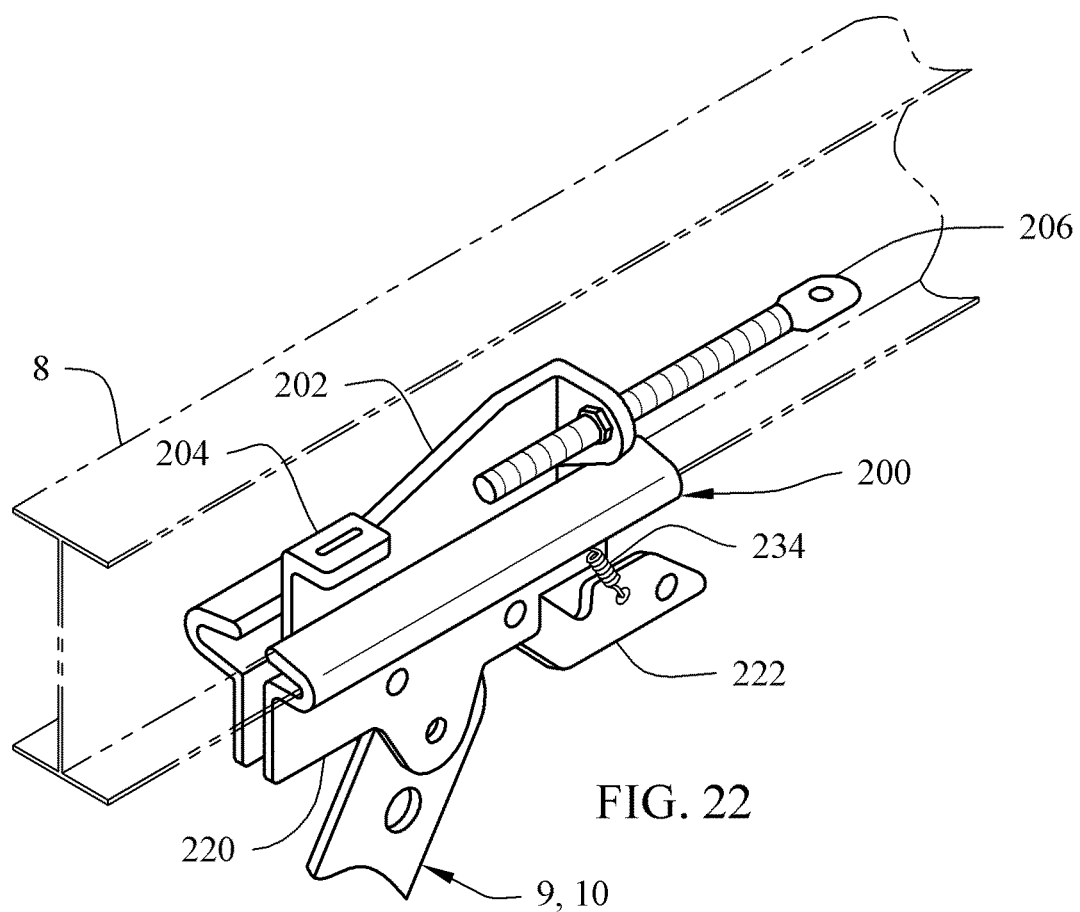
FIG. 22 is a perspective view of the trolley carriage of the present technology.
Figure 23:
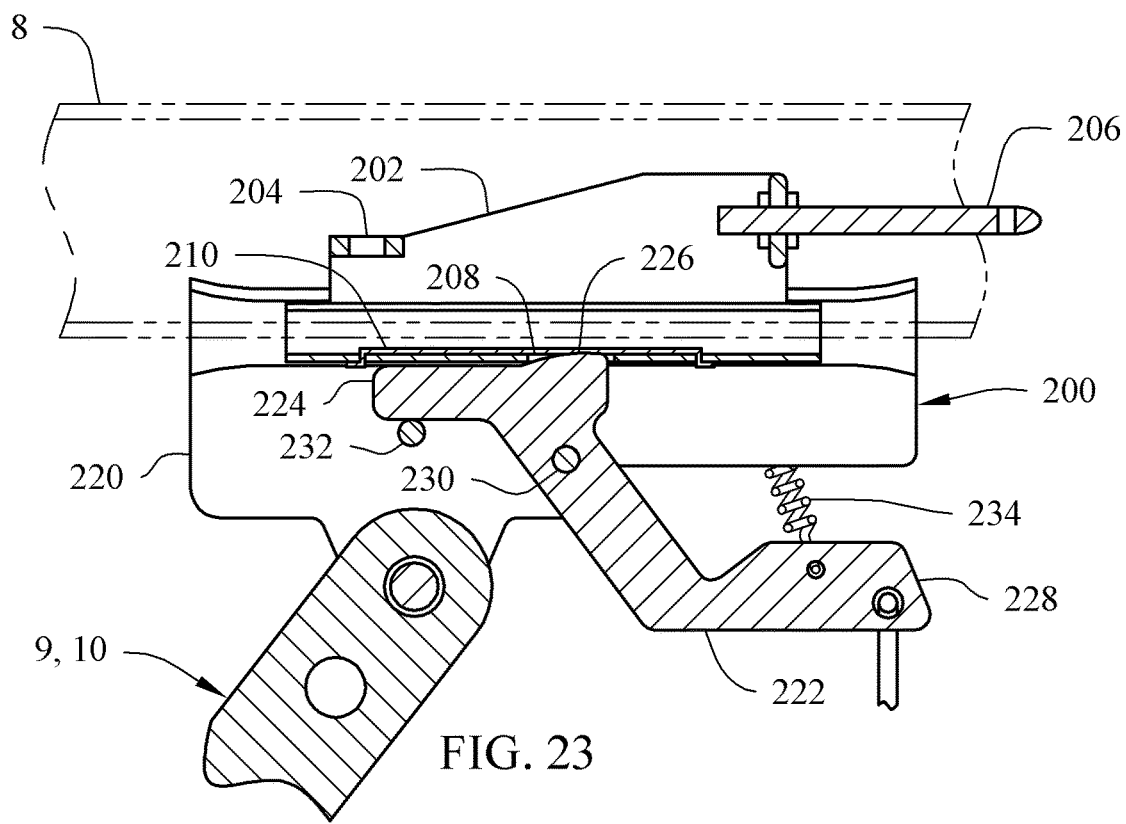
FIG. 23 is a cross-sectional view of the trolley carriage showing the modified release arm of the trolley carriage.
Figure 24:
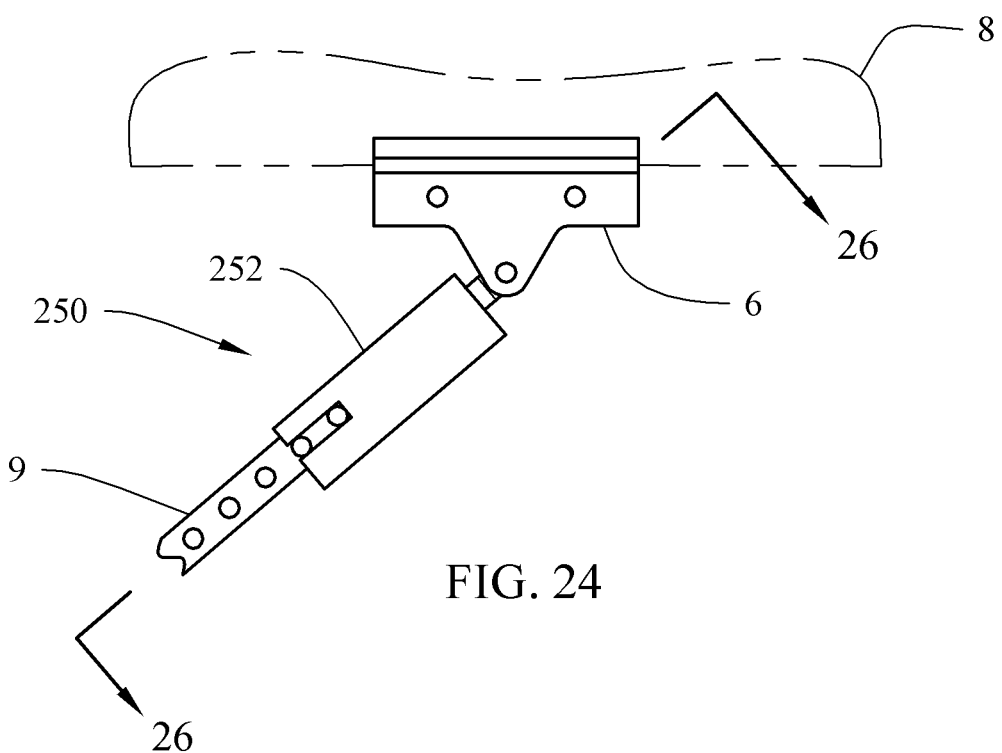
FIG. 24 is a side plan view of the automatic disengaging linkage system of the present technology for connecting a garage door J-arm to a garage door opener trolley.

Referring to FIGS. 22-23, the automatic disengaging linkage system of the present technology can be a trolley carriage system 200 including three components, in the exemplary, a carriage 202, a coupler 220, and an engaging arm 222. The garage door opener can include a motor unit coupled to a drive mechanism, such as but not limited to, a chain (not shown). The chain extends along the rail 8 mounted from the motor unit of the garage door opener and extending longitudinally therealong. The rail 8 can be, but not limited to a T-rail, I-rail, or any rail having vertical web and laterally extending flanges. The carriage 202 is configured to slide along the flanges of the rail 8, and includes a first end 204 coupled to one end of the chain, and a second end or connection 206 coupled to the other end of the chain. The second end or connection 206 can utilized a threaded rod for providing adjustability with connecting to the chain end. The chain is driven by the motor unit, which translates to longitudinal movement of the carriage 202 along the rail 8. The carriage 202 has a length extending along the longitudinal axis of the rail 8, and a width extending along a lateral axis of the rail 8 so as to receive the flanges.

The carriage 202 and the coupler 220 are releasably coupled together, with the coupler 220 slidably receiving a section of the carriage 202. The coupler 220 can be pair of coupler plates joined in a spaced apart relationship by way of members 230, 232, that can be but not limited to pins, spacers, fasteners, and the like.

A standard linkage J-arm 9 or the linkage system 10 of the present technology can be pivotably coupled to the coupler 220 and to the garage door bracket. As the carriage 202 is moved or driven along the rail 8 by the motor unit, the linkage arm 9, 10 cause the garage door to be raised or lowered.

The engaging arm 222 is pivotably mounted to or received between the coupler 220, and includes a first end section 224 and a second end section 228. The pivoting action is provided by the connection member 230 located between the first and second end sections 224, 228. The first end section 224 includes an engaging extension 226 that features a rounded, curved or arcuate edge surface. The edge surface is configured to be received through an opening 208 defined in a portion of the carriage 202 that slidably receives the flanges of the rail 8. A biased or spring plate 210 is fitted interior the carriage 202 to cover the opening 28 and press against the edge surface 226 when the carriage 202 is assembled with the coupler 220.

The second end section 228 can receive a cord to impart a rotational movement of the engaging arm 222 about the member 230. A spring 234 is connected to the coupler 220 and the second end portion 228 of the engaging arm 222 to provide a biasing or pulling force on the second end portion 228. The second member 232 can act to limit movement of the first end portion 224 away from the opening 208.

The edge surface 226 is configured to abut against an edge defining the opening 208, thereby translating movement of the carriage 202 along the rail 8 to the coupler 220, and thus to the linkage arm 9, 10. The configuration of the edge surface 226 and/or the biasing force of the spring 234 are configured, determined or configurable to be sufficient to keep the carriage 202 engaged with the coupler 220 during normal lifting and/or lower operations provided by the garage door opener, with an intact (non-broken) counterweight spring or freely traveling garage door rollers. However, the edge surface 226 and/or the biasing force of the spring 234 is further configured, determined or configurable to not be sufficient to keep the carriage 202 engaged with the coupler 220 during non-normal lifting and/or lower operations of the garage door, with a broken counterweight spring or obstructed garage door roller.

The edge surface 226 is configured to allow the side of the carriage 202 that defines the opening 208 to slide thereover upon a predetermined pulling force created by a weight of the garage door, a downward force of the garage door or pulling by movement of the trolley coupler due to operation of the garage door opener.

The spring 234 is configured to provide a biasing or pulling strength sufficient to keep the side of the carriage 202 that defines the opening 208 engaged with the edge surface 226 during normal lighting and/or lowering operations of the garage door opener. Normal operation of the garage door opener can include a non-broken counterweight spring, the garage door rollers not being obstructing, a predetermined weight or force imparted onto the trolley carriage 200, and/or a predetermined pulling force acting between the carriage 202 and the coupler 220.

The cord that is connected with the second end portion 228 can be pulled to impart rotation of the engaging arm 222, thereby pivoting the first end portion 224 towards the side of the carriage 202 that defines the opening 208. Consequently, lifting the side of the carriage 202 that defines the opening 208 away from the edge surface 226 and disengaging the carriage 202 from the coupler 220.

Referring to FIGS. 24-29, an embodiment automatic disengaging linkage system of the present technology can be a connector system 250 including a first end connectable to the trolley 6 and a second end connectable to an end of a garage door arm 9, which in the exemplary can be a J-arm, a straight arm, or any of the above described arms of the present technology. The connector system 250 can be configured to engage with the arm 9 during a predetermined lifting force provided by the trolley 6, and automatically disengage with the arm 9 when a second predetermined lifting force is encountered.

Figure 25:
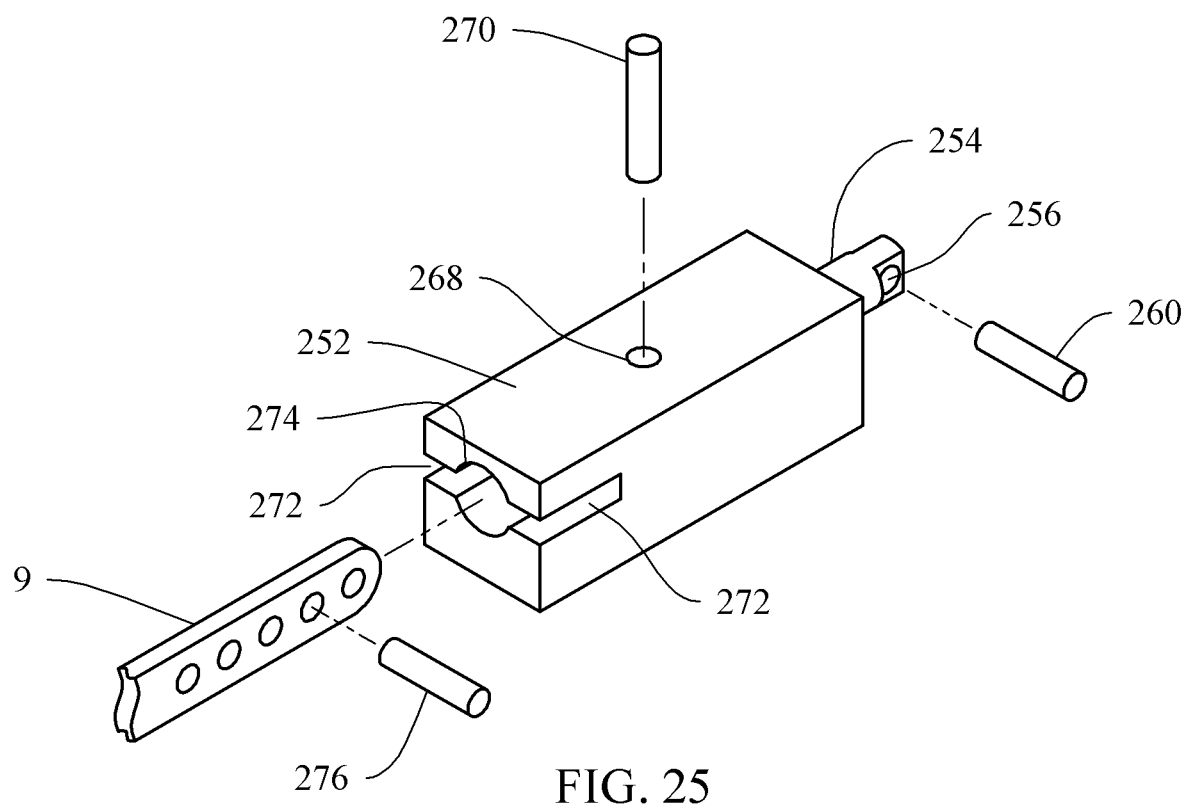
FIG. 25 is an exploded perspective view of the automatic disengaging linkage system of the present technology.

The connector system 250 can include a housing 252, a plunger shaft 254 extending out from the first end, and an arm bore 274 defined in the second end of the housing 252, as illustrated in FIG. 25. The plunger shaft 254 can include a free end featuring a trolley pin bore 256 defined therethrough that is configured to receive a trolley pin 260. The trolley pin 260 can be positioned through a plate of the trolley 6 and through the trolley pin bore 256, thereby connecting the housing 252 to the trolley 6. The trolley pin 260 can be configured to hold the arm 9 in place while the trolley 6 pulls or pushes the garage door open and closed.

A pair of slots 272 are defined through the second end of the housing 252 and which can be in communication with the arm bore 274. The arm bore 274 is configured to receive an end of the arm 9 so that at least one of its bores are alignable with the pair of slots 272. An arm pin 276 can be received through the slots 272 and the bore of the arm 9. The slots 272 can be configured to slidable receive the arm pin 276 in a longitudinal direction of the slots. Consequently, the arm 9 and the arm pin 276 can be slidably receive in the slots 272 and the arm bore 274, respectively, as best illustrated in FIGS. 25 and 26.

Figure 26:
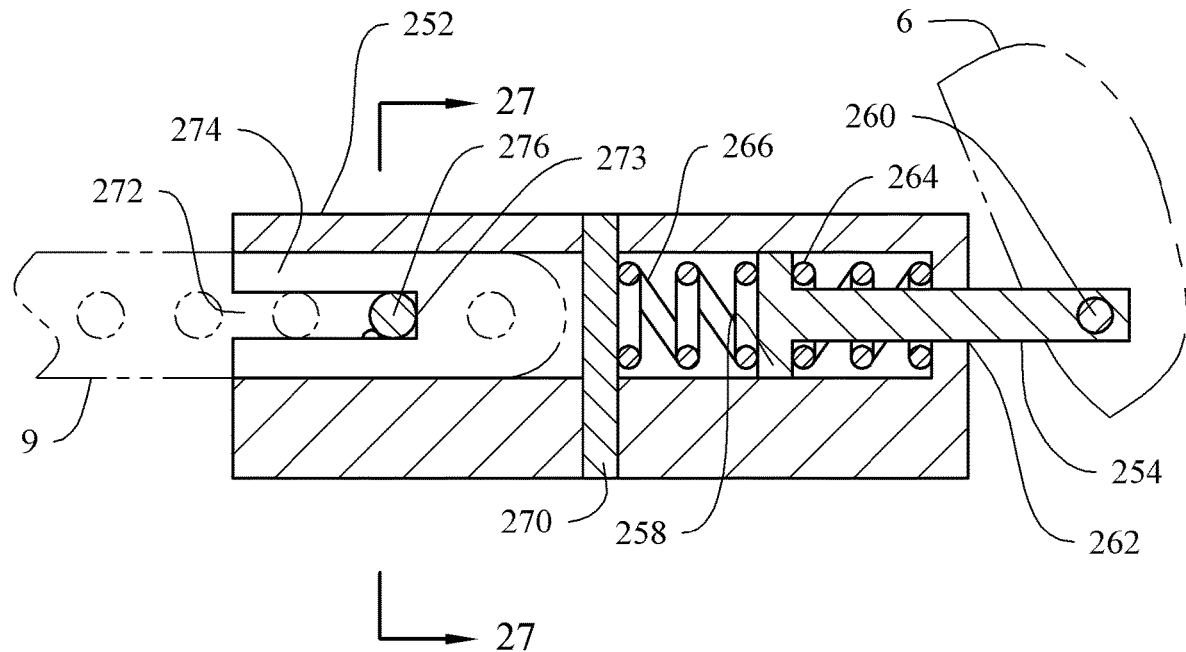
FIG. 26 is a cross-sectional view of the automatic disengaging linkage system taken along line 26-26 in FIG. 24.

Referring to FIG. 26, a plunger 258 can be attached or associated with the plunger shaft 254, and can be slidably received in the arm bore 274. The plunger 258 can have a width or diameter greater than the plunger shaft 254, with the plunger shaft 254 being slidably received through a plunger shaft bore 262 defined through the first end of the housing 252.

A first biasing member or spring 264 can be positioned in the arm bore 274 between the plunger 258 and the first end of the housing 252. A second biasing member or spring 266 can be positioned in the arm bore 274 between the plunger 258, opposite the first spring 264, and a spring pin 270 positionable in the arm bore 274. The spring pin 270 can be received through a spring pin bore 268 defined through the housing 252. The first and second springs 264, 266 can be configured to provide counter forces to the plunger 258, thereby acting like a dampener making it a gentle start and stop.

Figure 27:
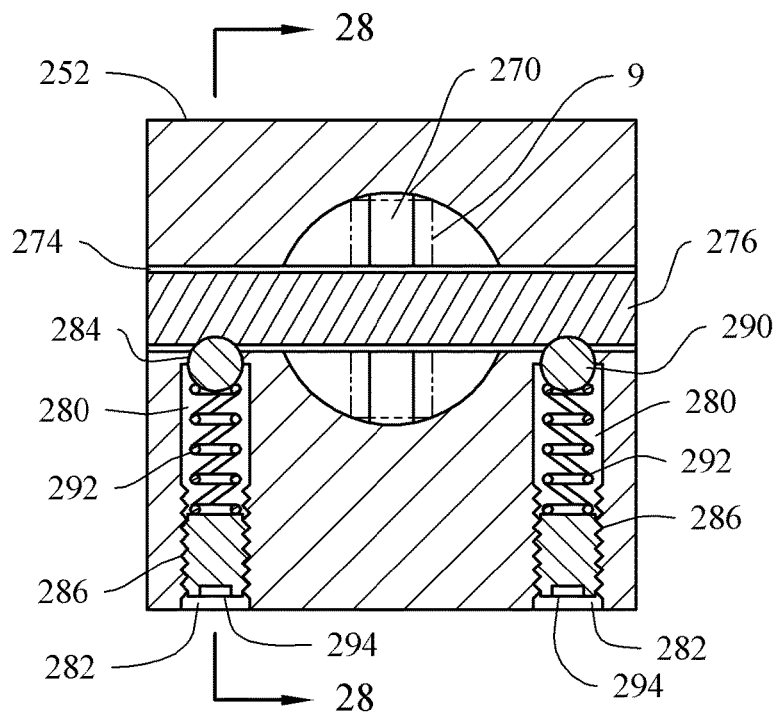
FIG. 27 is a cross-sectional view of the automatic disengaging linkage system taken along line 27-27 in FIG. 26.

Referring to FIG. 27, the housing 252 can include a pair of ball bores 280 defined through the housing 252 in a lateral-like direction and in communication with the slots 272, respectively. Each of the ball bores 280 can include a first open end 282 and a second open end 284. The second open end 284 can have a size, width or diameter smaller than the ball bore 280, thereby creating a stop edge.

A ball 290 can be received in each of the ball bores 280, and the ball 290 can be sized to seat against the stop edge formed by the second open end 284 so that a portion of the ball 290 extends into the slot 272.

A ball biasing member or ball spring 292 can be received in each of the ball bores 280 and positioned between the ball 290 and a setscrew 294. The ball spring 292 can provide a force against the ball 290 toward the stop edge formed by the second open end 284. The setscrew 294 can be threadably engageable with an internal threaded section 286 of the ball bore 280, which can allow for the spring force against the ball 290 to be adjusted.

Figure 28:
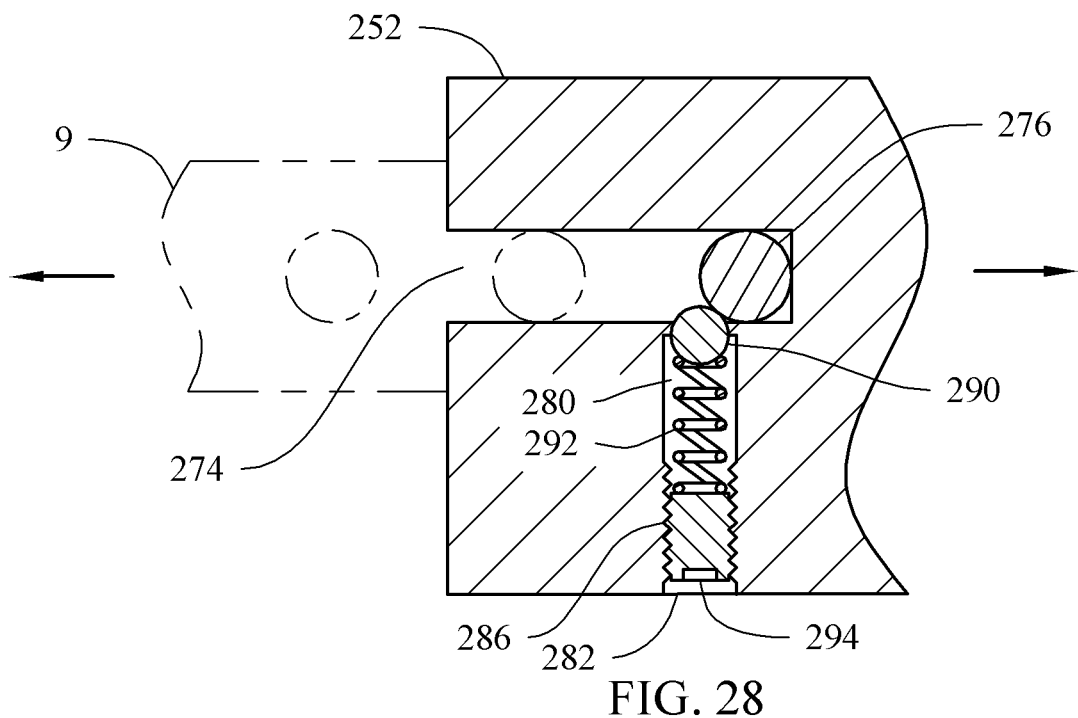
FIG. 28 is an enlarged cross-sectional view of the automatic disengaging linkage system with the J-arm latched in an engaged state.
Figure 29:
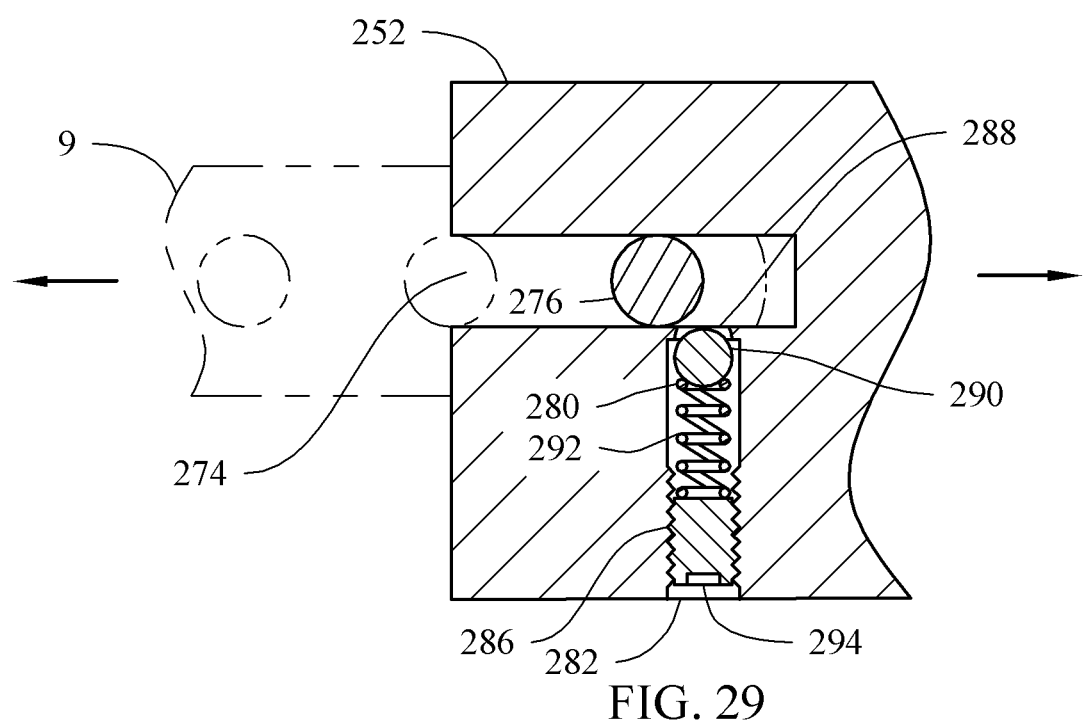
FIG. 29 is an enlarged cross-sectional view of the automatic disengaging linkage system with the J-arm latched in a disengaged state.

Referring to FIGS. 28 and 29, with the arm pin 276 received through the arm 9, the arm pin 276 can be positioned in the slots 272 so that the arm pin 276 is located between the balls 290 and an end surface 273 of the slots 272. The spring-loaded balls 290 are partially protruding into the slots 272 and can be configured to contact and stop the arm pin 276 from pulling through or out of the slots 272 during normal operation, as best illustrated in FIG. 28.

Normal operation can mean when the garage door spring and/or when the trolley 6 has not failed or been damaged. This engaged state can remain until a predetermined pulling force is encountered between the arm 9 and the housing 252.

The balls 290 and/or the springs 292 can be configured so that the balls 290 retract back inside ball bores 280, in a disengaged stated, when a predetermined disengage or set force is applied to the garage door arm 9. For example, but not limited to, when a broken spring will make the door heavier than the garage door opener can handle, thereby pulling out the arm pin 276 out.

To assist in avoiding a premature or unwanted disengaged state of the arm pin 276, the plunger 258 and springs 264, 266 act like a dampening means that can absorb some of an initial shock from the trolley 6 during an opening or closing operation.

In the exemplary, the connector system 250 can be assembled by inserting the first spring 264 in the arm bore 274, then inserting the plunger shaft 254 through the arm bore 274, through the first spring 264 and the shaft bore 262. The second spring 266 can then be inserted through the arm bore 274 to contact the plunger 258. The spring pin 270 can then be inserted through the spring pin bore 268 to hold the second spring 266, the plunger 258 and the first spring 264 in place.

In user, the plunger shaft 254 can be connected to the trolley 6 utilizing the trolley pin 260, thereby connecting the housing 252 to the garage door opener trolley 6. The arm 9 can be inserted through the arm bore 274, and the arm pin 276 can be inserted through the slots 272 and one of the bores defined through the arm 9, so that the arm pin 276 is positioned between the protruded portion of the balls 290 and the end surface 273 of the slots 272.

Once assembly, when an opening operation is performed with the trolley 6 pulling the housing 252, the initially shock of the opening operation can be absorbed via the plunger 258 and springs 264, 264. The weight of the garage door being pulled by and/or transferred to the arm pin 276 is against the protruding portion of the balls 290. During normal operation, the force of the springs 292 is sufficient to keep a portion of the balls 290 in the slots 272 and against the arm pin 276 without being retracted into the ball bores 280, thereby raising the garage door.

Alternatively, the force of the springs 292 keeps the balls 290 against the second bore 284 until a predetermined force is encountered between the arm pin 276 and the protruding portion of the balls 290. If this predetermined force is encountered, then this force may be sufficient to pull the arm pin 276 through and out of the slots 272 by pushing the balls 290 into the ball bores 280.

Figure 30:
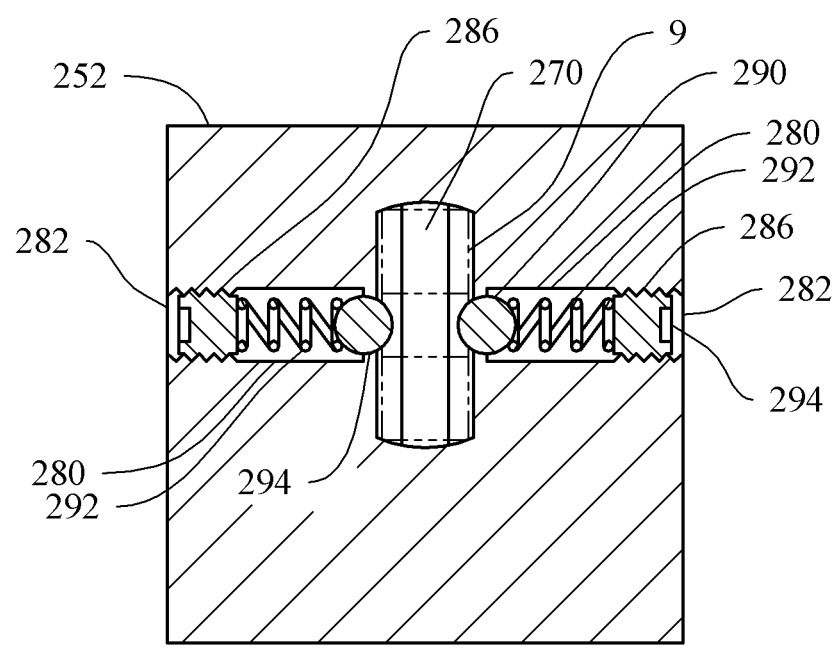
FIG. 30 is a cross-sectional view of an alternate embodiment ball, spring and garage door arm arrangement, without the arm pin.

Referring not to FIG. 30, an alternate embodiment of the housing 252 can be utilized that omits the slots, and the arm pin. In this embodiment, the pair of spring loaded ball 290 arrangements and their corresponding ball bores 280 are placed opposite each other on either side of the arm 9, so that each ball 290 is receivable in a hole or recess defined in the arm 9. The hole in the arm 9 can be one of the existing plurality of holes that are standard elements in garage door linkage arms.

In this embodiment, the springs 292 for a portion of the balls 290 into the hole of the arm 9 from either side. During normal operation, the force of the springs 292 is sufficient to keep a portion of the balls 290 in the defined in the arm 9 without being retracted into the ball bores 280, thereby raising the garage door.

Alternatively, the force of the springs 292 keeps the balls 290 defined in the arm 9 until a predetermined force is encountered between the arm 9 and the protruding portion of the balls 290. If this predetermined force is encountered, then this force may be sufficient to pull the arm 9 through and out of the arm bore 272 by pushing the balls 290 into the ball bores 280.

It can be appreciated that the springs 292, balls 290 and arm pin 276 arrangement can provide an automatic disengagement of the arm 9 and the housing 252 when a disengagement force is encountered, thereby protecting the garage door opener, the trolley 6, the arm 9, and/or the garage door from damage due to, but not limited to, a failed garage door spring.

Any magnet utilized in the present technology can be made from, but not limited to, ferromagnetic materials, ferrimagnetism materials, paramagnetic materials, diamagnetic materials or an electromagnet. Ferromagnetic and ferromagnetic materials can be, but not limited to, iron, nickel, cobalt, alloys of rare earth metals, lodestone, alnico, ferrite, gadolinium, dysprosium, magnetite, samarium-cobalt, neodymium-iron-boron (NIB), lanthanoid elements, ceramics or curable resins comprising magnetic materials. Paramagnetic materials can be, but not limited to, platinum, aluminum, oxygen or magnetic ferrofluids.

The magnet or magnets utilized in the present technology can be attached to its corresponding surface by way of, but not limited to, its own magnetic attractive force, an adhesive, one or more fasteners, one or more clamps, one or more mechanical means, a geometric joint arrangement, one or more latches or clasps, or friction fitted.

It can be appreciated that the present technology can be utilized with a magnet alone or in combination with a spring, with a spring alone or in combination with a magnet, with two or more magnets, or two or more springs, configured to keep the first and second arms in the closed configuration upon encountering a predetermined pulling force.

It can be further appreciated that the present technology can be utilized with and/or operably connected to one or more sensors, a computer control or monitoring system, an alarm system, a transmitter, a receiver, a transceiver, a remote control system, a network system, one or more cameras, or a motorized actuation system or assembly.

It can further be appreciated that the present technology is not limited to disengaging with the door bracket pin 4, but can be utilized in a reverse arrangement where the present technology is disengagable with the trolley carriage pin 6, with an opposite end portion of the present technology being pivotably attached with the door bracket pin 4.

While embodiments of the automatic disengaging linkage system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although preventing a garage door and/or opener from being damage due to spring failure or roller obstruction by releasing a J-arm from the door bracket or door bracket or trolley coupler have been described, it should be appreciated that the linkage system of the present technology herein described is also suitable for automatically disengaging a first object from a second object upon a predetermined pulling force by separating magnetically attracted members due to the predetermined pulling force.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. An automatic disengaging linkage system comprising:
   a housing operably connectable to a moving member and a moveable member, the moving member being a garage door trolley, and the moveable member being a garage door arm;
   a ball receivable in a ball bore defined in the housing;
   a biasing member configured to bias the ball toward the moveable member or an arm pin associated with the moveable member; and
   a plunger slidably receivable in a main bore defined in the housing, the plunger including a plunger shaft slidably receivable through a shaft bore defined through an end of the housing, the plunger shaft being connectable to the garage door trolley;
   wherein the ball or the biasing member is configured to hold the moveable member with the housing until a predetermined pulling force is applied to the housing.

2. The automatic disengaging linkage system of claim 1 further comprising a pair of springs oppositely positioned against the plunger.

3. The automatic disengaging linkage system of claim 2 further comprising a spring pin received through the housing, the spring pin being configured to hold at least one of the springs in place.

4. The automatic disengaging linkage system of claim 1, wherein the main bore being configured to receive a portion of the garage door arm.

5. The automatic disengaging linkage system of claim 1, wherein the housing further comprising one or more slots defined in the housing and in communication with the main bore.

6. The automatic disengaging linkage system of claim 5, wherein the ball bore being configured to protrude a portion of the ball into one of the slots or into the main bore.

7. The automatic disengaging linkage system of claim 6, wherein the ball bore includes a first open end configured to receive a setscrew to hold the biasing member against the ball.

8. The automatic disengaging linkage system of claim 7, wherein the ball bore includes a second open end having a size smaller than the ball bore, the size of the second open end allows the portion of the ball therethrough while prevent a remaining portion of the ball from passing therethrough.

9. The automatic disengaging linkage system of claim 5, wherein the slots are configured to slidably receive an arm pin associated with the garage door arm, with a portion of the ball being configured to contact the arm pin.

10. The automatic disengaging linkage system of claim 1, wherein a portion of the ball is receivable in a bore or recess defined in the garage door arm.

11. An automatic disengaging linkage system comprising:
    a housing operably connectable to a garage door trolley, the housing defining a main bore configured to receive a portion of a garage door arm, the housing further comprising one or more slots defined in the housing and in communication with the main bore;
    a ball receivable in a ball bore defined in the housing, wherein the ball bore is in communication with the main bore so at least a portion of the ball is receivable in the main bore; and
    a biasing member configured to force the ball in engagement with the garage door arm or an arm pin associated with the garage door arm;
    wherein the ball or the biasing member is configured to disengage with the garage door arm with the housing when a predetermined pulling force is applied to the housing;
    wherein the ball bore being configured to protrude a portion of the ball into one of the slots or into the main bore.

12. The automatic disengaging linkage system of claim 11 further comprising a plunger slidably receivable in a main bore defined in the housing, the plunger including a plunger shaft slidably receivable through a shaft bore defined through an end of the housing, the plunger shaft being connectable to the garage door trolley.

13. The automatic disengaging linkage system of claim 12 further comprising a pair of springs oppositely positioned against the plunger.

14. The automatic disengaging linkage system of claim 11, wherein the ball bore includes a first open end configured to receive a setscrew to hold the biasing member against the ball.

15. The automatic disengaging linkage system of claim 14, wherein the ball bore includes a second open end having a size smaller than the ball bore, the size of the second open end allows the portion of the ball therethrough while prevent a remaining portion of the ball from passing therethrough.

16. A method of using an automatic disengaging linkage system, the method comprising the steps of:
    a) connecting a housing to a garage door trolley and to a garage door arm;
    b) biasing a ball toward the garage door arm or an arm pin associated with the garage door arm using a biasing member; and
    c) disengaging the garage door arm from the housing when a predetermined pulling force is applied to the housing.

* * * * *